(12) United States Patent
Dhere et al.

(10) Patent No.: US 10,609,171 B2
(45) Date of Patent: Mar. 31, 2020

(54) METHODS AND APPARATUS TO IMPROVE INTERPROCESS COMMUNICATION

(71) Applicant: Intel IP Corporation, Santa Clara, CA (US)

(72) Inventors: Amol Shivaji Dhere, Aalborg East (DK); Henrik Krogh Moeller, Svenstrup (DK)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 15/775,935

(22) PCT Filed: Dec. 22, 2015

(86) PCT No.: PCT/US2015/067436
§ 371 (c)(1),
(2) Date: May 14, 2018

(87) PCT Pub. No.: WO2017/111955
PCT Pub. Date: Jun. 29, 2017

(65) Prior Publication Data
US 2018/0375951 A1    Dec. 27, 2018

(51) Int. Cl.
G06F 15/16    (2006.01)
H04L 29/08    (2006.01)
G06F 9/54    (2006.01)

(52) U.S. Cl.
CPC .......... *H04L 67/2823* (2013.01); *G06F 9/541* (2013.01); *H04L 29/08* (2013.01); *H04L 67/2804* (2013.01)

(58) Field of Classification Search
CPC . H04L 67/2823; H04L 29/08; H04L 67/2804; G06F 9/541
(Continued)

(56) References Cited

U.S. PATENT DOCUMENTS 7,366,739 B2* 4/2008 Sugawara ............. G06F 16/221
7,533,172 B2 5/2009 Traversat et al.
(Continued)

OTHER PUBLICATIONS

International Bureau, "International Preliminary Report on Patentability," issued in connection with International Patent Application No. PCT/US2015/067436, dated Jun. 26, 2018, 5 pages.
(Continued)

*Primary Examiner* — Thuong Nguyen
(74) *Attorney, Agent, or Firm* — Hanley, Flight & Zimmerman, LLC

(57) ABSTRACT

Methods, apparatus, systems and articles of manufacture are disclosed to improve interprocess communication. An example apparatus to improve network transmission efficiency of a sending peer includes an encoder interface to prevent an encoder from encoding data in a native format to a target format associated with a requesting peer in response to a transmission trigger, a composite interface description (CID) engine to generate architecture agnostic metadata of the data in the native format, a composite layout description (CLD) engine to generate architecture specific metadata of the data in the native format, the architecture specific metadata identifying offset values associated with elements of the data in the native format, and a client payload engine to improve the network transmission efficiency by sending unencoded data combined with the architecture agnostic metadata and the architecture specific metadata to the requesting peer having an architecture different than that of the sending peer.

25 Claims, 16 Drawing Sheets

(58) Field of Classification Search
USPC .................. 709/203, 246; 726/23; 370/392; 375/240.26
See application file for complete search history.

(56) References Cited

U.S. PATENT DOCUMENTS

| | | | |
|---|---|---|---|
| 7,849,140 B2 | 12/2010 | Abdel-Aziz et al. | |
| 8,234,410 B2 | 7/2012 | Alexander et al. | |
| 2003/0091337 A1* | 5/2003 | Kubsch | G11B 27/034 386/241 |
| 2008/0002830 A1* | 1/2008 | Cherkasov | G06Q 10/101 380/277 |
| 2008/0098477 A1* | 4/2008 | Williams | H04L 63/1416 726/23 |
| 2009/0287516 A1* | 11/2009 | Schlenther | G06Q 10/06 705/7.11 |
| 2009/0320082 A1* | 12/2009 | Collazo | H04N 7/165 725/105 |
| 2012/0265853 A1 | 10/2012 | Knox et al. | |
| 2013/0083798 A1* | 4/2013 | Lakshmanamurthy | H04L 69/22 370/392 |
| 2013/0086149 A1* | 4/2013 | Shi | G06F 9/546 709/203 |
| 2014/0164563 A1 | 6/2014 | Leekley et al. | |
| 2015/0220752 A1* | 8/2015 | Inomata | H04L 67/06 713/165 |
| 2017/0140570 A1* | 5/2017 | Leibel | A63F 13/20 |
| 2017/0329822 A1* | 11/2017 | Rastogi | G06F 8/41 |

OTHER PUBLICATIONS

Japanese Patent Office, "Notice of Allowance," issued in connection with Japanese Patent Application No. 2016-235551, dated Mar. 15, 2018, 4 pages.

Japanese Patent Office, "Notice of Reasons for Rejection," issued in connection with Japanese Patent Application No. 2016-235551, dated Dec. 12, 2017, 8 pages.

International Searching Authority, "International Search Report," issued in connection with PCT Application No. PCT/US2015/067436, dated Aug. 24, 2016, 4 pages.

International Searching Authority, "Written Opinion," issued in connection with PCT Application No. PCT/US2015/067436, dated Aug. 24, 2016, 4 pages.

* cited by examiner

| | PEER 1 /702 | | | PEER 2 /704 | | | | |
|---|---|---|---|---|---|---|---|---|
| | | | | | | | /720 | /722 |
| | /714 | /716 | /718 | /714 | /716 | /718 | Element | Secondary (2°) |
| | Element Index | Element Name | Element Value | Element Index | Element Name | Element Value | Parity | Resolution |
| Composite Type /706 | enum | | | enum | | | | |
| Composite Name /708 | colors | | | colors | | | | |
| Composite Size (bytes) /710 | 2 | | | 4 | | | | |
| Composite Elements /712 | 0 | red | ---(0) | 0 | red | --- | TRUE | n/a |
| 728 → | 1 | green | ---(1) | 1 | green | 50 | TRUE | n/a |
| 724 → | 2 | blue | ---(2) | 2 | yellow | 700 | FALSE | Peer 1=2° term "yellow"<br>Peer 2 = 2° term "yellow" |
| 726 → | 3 | yellow | 900 | 3 | black | 1000 | FALSE | Peer 1=2° term "black"<br>Peer 2=2° term "black" |
| | 4 | black | 1000 | 4 | grey | ---(1001) | FALSE | Peer 1=2° term "grey"<br>Peer 2=2° term "grey" |
| | 5 | grey | ---(1001) | 5 | brown | ---(1002) | FALSE | Peer 1=2° term "brown"<br>Peer 2=2° term "brown" |
| | 6 | brown | ---(1002) | 6 | magenta | 100000 | FALSE | Peer 1=2° term "brown"<br>Peer 2=FALSE |
| | ... | ... | ... | ... | ... | ... | ... | ... |

METHODS AND APPARATUS TO IMPROVE INTERPROCESS COMMUNICATION

CROSS-REFERENCE TO RELATED APPLICATIONS

This patent arises from a 371 Nationalization of International Patent Application Serial No. PCT/US2015/067436, which is entitled "METHODS AND APPARATUS TO IMPROVE INTERPROCESS COMMUNICATION", and which was filed on Dec. 22, 2015, the subject matter of which is expressly incorporated herein by reference in its entirety.

FIELD OF THE DISCLOSURE

This disclosure relates generally to information exchange, and, more particularly, to methods and apparatus to improve interprocess communication.

BACKGROUND

In recent years, server devices have collected information from ubiquitous network client devices, such as mobile telephones, tablets, personal computers, and the like. In some examples, the client devices perform one or more tasks to collect information as instructed by program(s) executing thereon. In response to a request from the client devices, the server devices store the collected information in a particular format for circumstances when requesting entities wish to retrieve the collected information. Because the different client devices, server devices and requesting entities may have different architecture types, the client devices encode their collected task information into one or more particular formats that can be read and/or otherwise processed by the server devices.

BRIEF DESCRIPTION OF THE DRAWINGS

FIG. 7 is an example enumeration resolution table (ERT) constructed in accordance with the teachings of this disclosure.

DETAILED DESCRIPTION

Figure 1A:
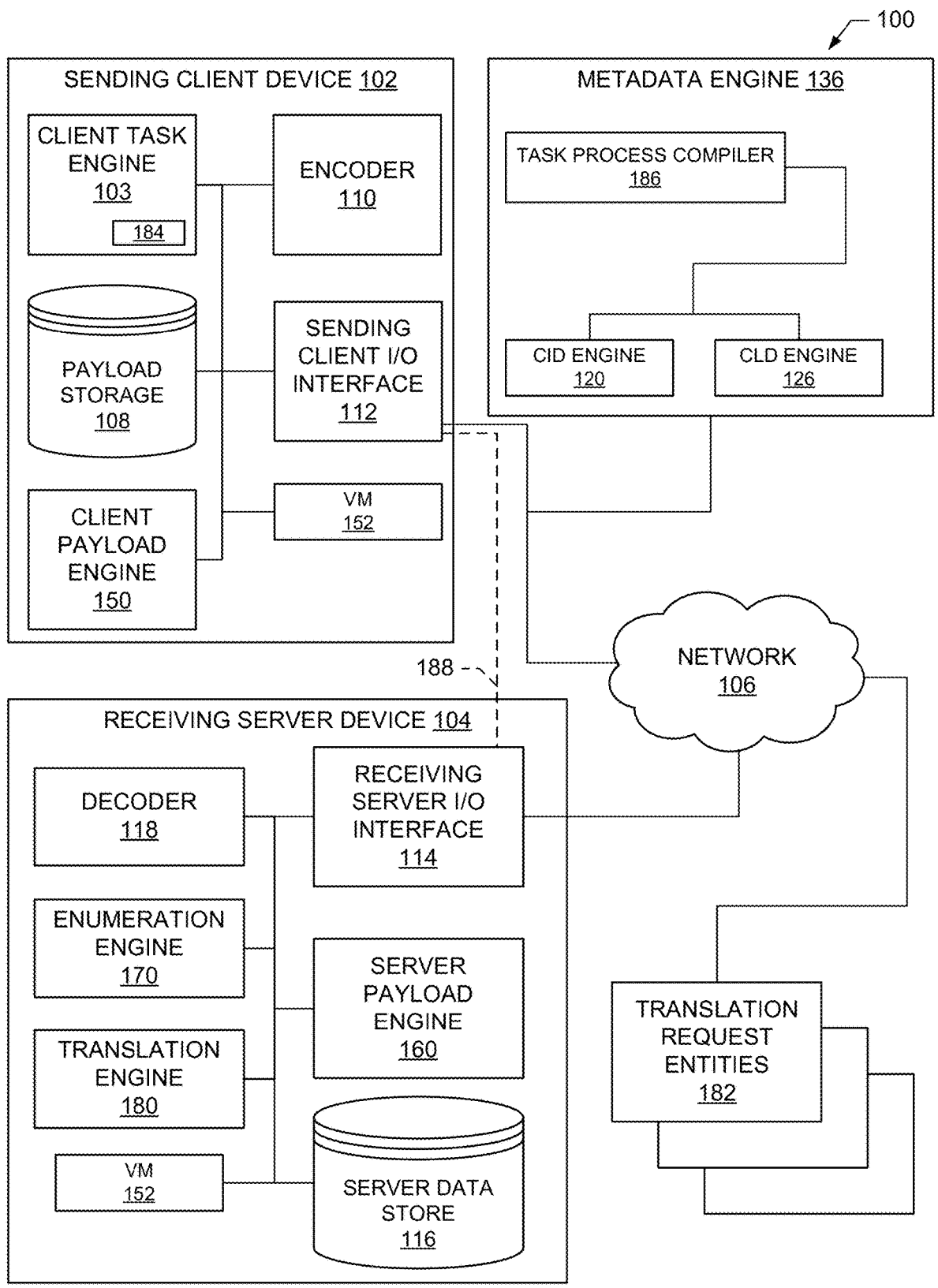
FIG. 1A is a schematic illustration of a network environment including a system to improve interprocess communication.

Network applications may exchange data in response to one or more triggers, such as remote procedure calls (RPCs), in which an example first application (e.g., a networked server) sends a request having particular data fields, and expects a response from an example second application (e.g., a networked mobile peer device) including those same data fields. In some examples, the second application may send reports in response to triggers, such as periodic time durations, aperiodic time durations, scheduled time durations, memory storage capacity threshold values, sensor response events, and/or manual triggers. Data collected and/or otherwise acquired by the example second application may be stored on a client device that executes the second application, in which the collected data is stored in a memory and/or other storage in a native format, such as a binary format. Data stored in a binary format is typically architecture specific, in which different architectures utilize different byte sizes (e.g., 8-bits per byte, 16-bits per byte, etc.), different endianness (e.g., big-endian, little-endian, mixed-endian, etc.), and/or different offset alignments.

FIG. 1 is an example interprocess environment 100 having an example sending client device 102 communicatively connected to an example receiving server device 104 via an example network 106. In some examples, the sending client device 102 and the receiving server device 104 reside and/or otherwise operate on a common platform, in which communication therebetween employs a communication bus 188 instead of the example network 106. The example network 106 may employ any type of communication protocol (e.g., TCP/IP, socket communication protocol/interface, interprocess communication via I$^2$C, shared memory, etc.) and include a wired network (e.g., CAT5 router/switch network), a wireless network (e.g., WiFi), and/or a cell-based network (e.g., GSM, CDMA, etc.). In still other examples, the network 106 is not employed and any other type of communication protocol may be employed within the same platform as a logical communication rather than a hardware-based communication. In operation, the example sending client device 102 performs one or more tasks, such as task process(es) 184, with an example client task engine 103 or a virtual machine (VM) 152 and sends (via an example sending client input/output (I/O) interface 112) collected and/or otherwise generated data (such as task data stored in an example payload storage 108 of the sending client device 102) to the example receiving server device 104 (via an example receiving server I/O interface 114) to be stored in an example server data store 116. While the illustrated example of FIG. 1 includes a single task process 184, examples disclosed herein may include any number of task processes. Prior to sending, traditional applications of the example sending client device 102 invoke an encoder 110 to encode the payload into a format that is compatible with the example receiving server device 104. In particular, the example encoder 110 encodes in a format that is compliant with an example decoder 118 of the example receiving server device 104. As such, in the event of any changes to device architecture and/or data schema, alterations of the corresponding example encoder 110 and example decoder 118 must be addressed to ensure successful communication therebetween. The example sending client device 102 may transmit one or more portions of the data in the example payload storage 108 in response to a request from the example receiving server device 104 and/or in response to any other type of trigger (e.g., time-based triggers managed by the sending client device 102, sensor based triggers managed by the sending client device 102, etc.).

However, because an architecture of the example sending client device 102 may differ from an architecture of the example receiving server device 104, the sending client device 102 includes the example encoder 110 to encode one or more portions of the data from a native binary format into a format that can be processed by the example receiving server device 104. For example, the encoder 110 may convert and/or otherwise encode the native binary (or portions thereof) to an extensible markup language (XML) format, an abstract syntax notation (ASN, e.g., ASN.1) format, a text format (e.g., ASCII), etc. In some examples, encoding the native binary to an alternate format results in a relatively larger data storage footprint. Additionally, the example encoder 110 of the sending client device 102 is unique to a predetermined format of interest that is to communicate with one or more receiving server device(s).

Example sending client devices, such as the example sending client device 102 of FIG. 1, typically have limited processing and/or storage resources. In some examples, the sending client device 102 is a wireless telephone with (a) power consumption capabilities that are limited by battery capacity, (b) storage size capabilities that are limited by on-board memory and/or (c) processing capabilities that are limited by on-board processing device(s). Additionally, when a binary is encoded into an alternate format, the alternate format of the data (e.g., human readable ASCII) is less secure during transmission as compared to the native binary format. Furthermore, in the event the example sending client device 102 and/or the example receiving server device 104 alters a schema for encoding and/or decoding operations, compatibility therebetween is disrupted, thereby requiring additional configuration operations to enable communication.

Example methods, apparatus, articles of manufacture and/or systems disclosed herein facilitate an improved manner of exchanging information between peers (e.g., the example sending client device 102 and the example receiving server device 104) of a network 106 (or within a common platform). As described in further detail below, an example client payload engine 150 facilitates sending data from the example sending client device 102 in a manner that preserves a native binary format that may have been generated by one or more task processes 184 of the example client task engine 103 and/or stored in the payload storage 108.

Such preservation of the native binary format reduces a computational burden of the example sending client device 102 that would otherwise traditionally occur when encoding the native binary to a human-readable format prior to sending to one or more destination peer(s). Furthermore, such preservation of the native binary format reduces a storage capacity requirement of the sending device 102 because native binary formats exhibit a relatively smaller storage footprint than data encoded in a human-readable format. Because transmitting the native binary format reflects a relatively lower bandwidth when compared to encoded versions of the binary into an alternate format, network transmission efficiency is improved. Moreover, by sending data in its native binary format, it exhibits superior security characteristics when compared to human-readable format(s), and consumes less bandwidth during transmission.

Additionally, and as described in further detail below, an example server payload engine 160 facilitates reception of data in the binary format from a sending peer that may exhibit architecture differences of the example receiving server device 104, thereby allowing the network transfer of the binary format to maintain its inherent security as compared to traditional human-readable format(s). An example enumeration engine 170 facilitates mapping of data composite types of ENUM between peers that may not operate with a similar architecture (e.g., different value mappings may be employed for ENUM elements, such as similar names having different values), as described in further detail below. An example translation engine 180 facilitates requests (e.g., translation requests to render data associated with a composite stored on the example receiving server device 104 (the receiving peer)) that may originate from one or more translation request entities 182 and/or the example receiving server device 104, as described in further detail below.

To facilitate the improved manner of exchanging information between peers (e.g., the example sending client device 102 and the example receiving server device 104), the example interprocess environment 100 includes an example metadata engine 136 communicatively connected to the example sending client device 102 and/or the example receiving server device 104 via at least one of the example network 106 and/or the example communication bus 188. In the illustrated example of FIG. 1A, the metadata engine 136, primarily used prior to run time, includes a composite interface description (CID) engine 120, a composite layout description (CLD) engine 126, and a task process compiler 186, discussed in further detail below.

In operation, the example sending client device 102 retrieves and/or otherwise receives one or more task process(es) 184 to be executed in a manner that retrieves and/or otherwise collects payload data to be stored in the example payload storage 108. As described above, the example sending client device 102 may be a device having limited processing and/or storage resources, but able to execute one or more task process(es) 184 to accomplish, for example, data acquisition operations. The example task process(es) 184 may be compiled into an executable format by an example task process compiler 186 of the example metadata engine 136. Payload data generated by the task process(es) 184 includes one or more associated composites. As used herein, a composite reflects a portion of a payload in the example payload storage 108 having data fields and/or data units. An example composite includes a C-structure having variable names, variable types and corresponding variable values (e.g., values for each variable name). One or more payloads stored in the example payload storage 108 may include any number and/or type of composite.

Traditional sending client devices 102 are typically instructed to send and/or otherwise transmit one or more payloads that will invoke the example encoder 110 to encode a native binary of the requested composite to a format expected by the example receiving server device. However, examples disclosed herein improve bandwidth utilization during the sending process by preventing the encoder (e.g., for legacy peers having an encoder) from encoding the composite(s), thereby allowing the sending of data to a peer (e.g., the example receiving server device 104) in its native binary format. Additionally, because the composite is sent in its native binary format, the composite is more secure by preventing a human-readable format from being rendered in the event of interception and/or network sniffing. In some examples, the native binary format, as distinguished from a human-readable format, is considered security by way of obscurity.

Figure 1B:
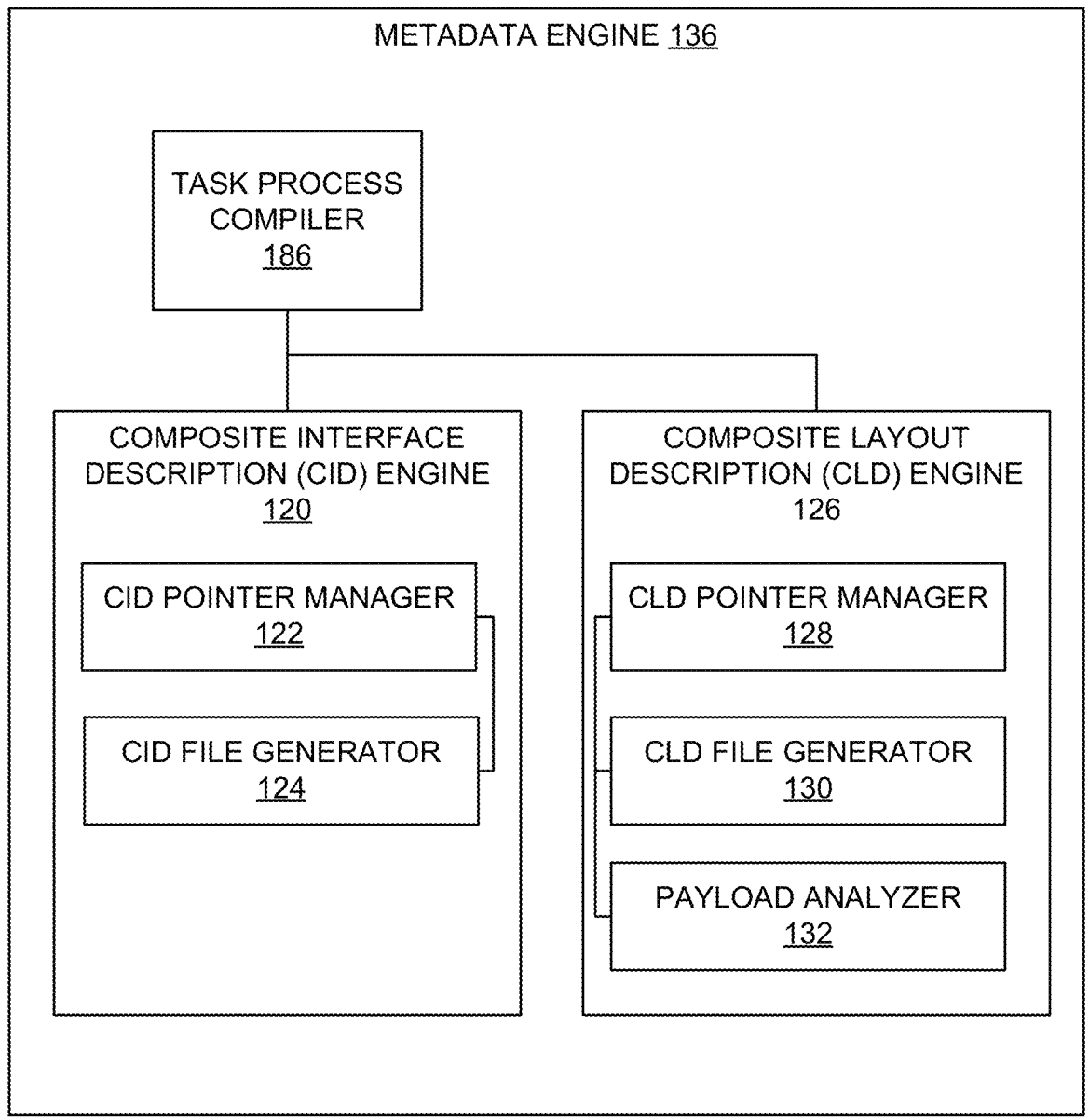
FIG. 1B is a schematic illustration of an example interprocess communication engine of FIG. 1A.

FIG. 1B includes additional detail associated with the example metadata engine 136 of FIG. 1A. In the illustrated example of FIG. 1B, the CID engine 120 also includes a CID pointer manager 122 and a CLD file generator 124. Additionally, the example CLD engine 126 also includes an example CLD pointer manager 128, an example CLD file generator 130, and an example payload analyzer 132. In response to the example task process compiler 186 compiling a task process 184, the example CID engine 120 generates a CID associated with the composite to be sent. Generally speaking, and as described in further detail below, composite metadata facilitates shorthand reference to an associated CID and CLD of the composite. As described in further detail below, the CID is an architecture agnostic textual or combined binary and textual description of the composite, which includes a definition of a type of the composite (e.g., a C-structure, etc.), a name of the composite, and a list of composite element names and corresponding types and array dimensions. Additionally, the example CLD engine 126 generates a CLD associated with the composite to be sent. As described in further detail below, the CLD is an architecture specific textual or combined textual/binary description of the composite, which includes a size of the composite (e.g., a number of bytes), a number of elements in the composite, and a byte offset values for respective elements within the binary image.

Taken together, the example CID and the CLD represent the composite metadata, which is compiled into the task process 184 or, in the case of virtualized languages like JAVA, the composite metadata is stored in a virtual machine (VM) 152 and/or stored in the example payload storage 108 of the sending client device 102. After the example task process 184 is compiled and the metadata is included therein, the example metadata engine 136 is no longer needed during run time. Generally speaking, after the example CID engine 120 generates the CID associated with the composite and the example CLD engine 126 generates the CLD associated with the composite, any future reference to the composite (and the associated CID and CLD) to be sent may be referenced via the example metadata reference to conserve processing resources of the example sending client device 102. The generated composite metadata, which includes the CID and the CLD, is later retrieved during run time by an example metadata reference manager 134 (in circumstances of a compiled task process 184), or retrieved from the VM 152 and associated with a unique metadata reference (e.g., textual and/or numeric nomenclature to identify the composite metadata), in which other devices using this reference can generate consistent results despite any architecture differences that may exist therebetween. The example metadata reference manager 134 is located in the example client payload engine 150 and described in further detail below.

Figure 2:
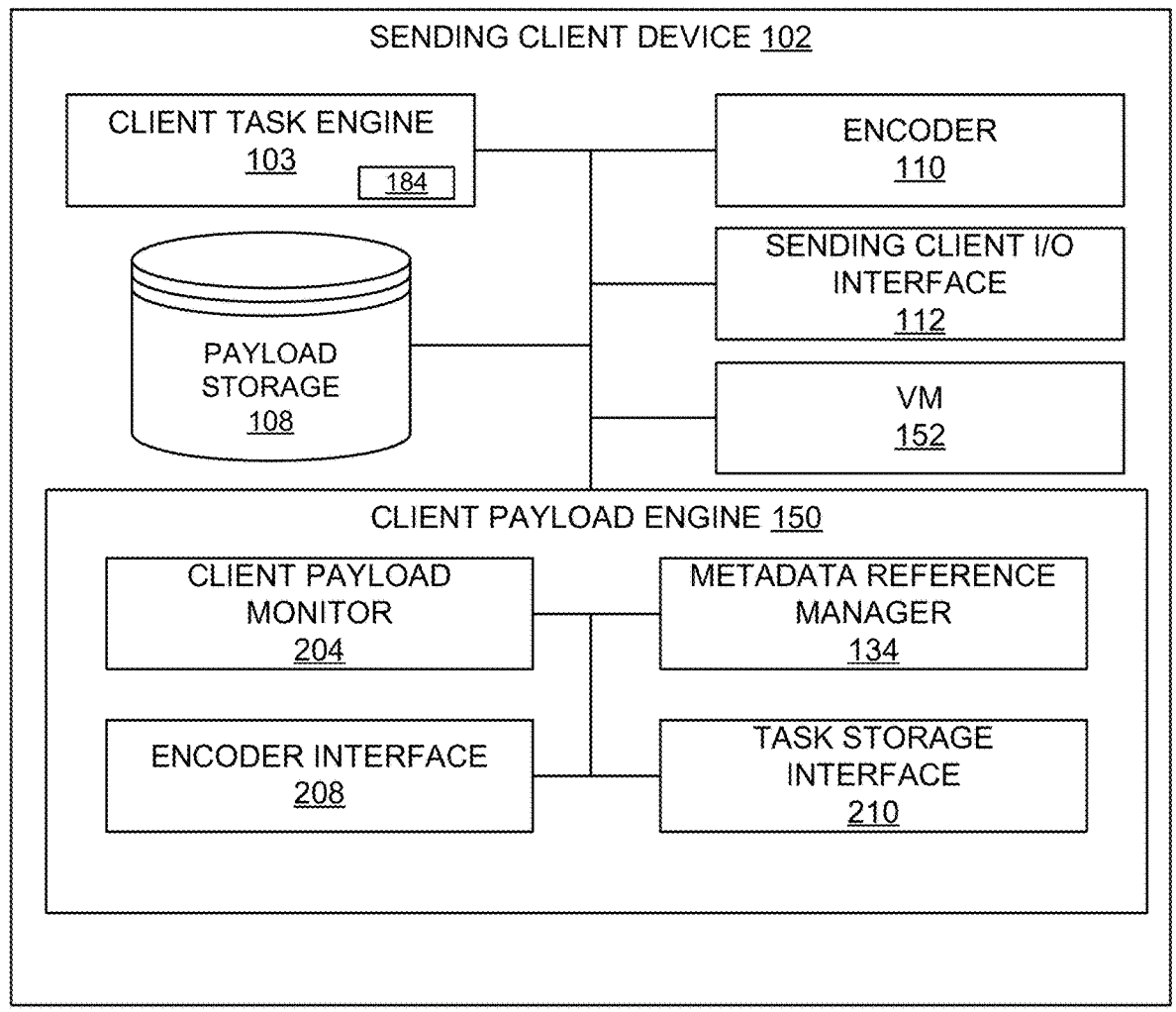
FIG. 2 is a schematic illustration of a sending client device constructed in accordance with the teachings of this disclosure.

FIG. 2 is a schematic illustration of the example sending client device 102 of FIG. 1, and includes additional detail related to managing data stored in the example payload storage 108 and/or generated by one or more task process(es) 184 of the example client task engine 103. In the illustrated example of FIG. 2, the sending client device 102 includes the client task engine 103 having one or more executable task process(es) 184, the payload storage 108, the encoder 110 (e.g., a legacy encoder), and the sending client I/O interface 112 communicatively connected to the network 106 and/or communication bus 188, as described above in connection with FIG. 1. Additionally, the example sending client device 102 of FIG. 2 includes the example VM 152, the example client payload engine 150, an example client payload monitor 204, an example encoder interface 208, an example task storage interface 210, and the example metadata reference manager 134.

In operation, the example client payload monitor 204 determines whether the example payload storage 108 includes information that is to be sent and/or otherwise transmitted to the example receiving server device 104. In some examples, the client payload monitor 204 responds to one or more triggers to identify available information in the payload storage 108, such as a request from the receiving server device 104 (e.g., a remote procedure call (RPC), a time-based trigger, a sensor based trigger and/or a trigger based on a threshold capacity of stored information in the payload storage 108. When the example client payload monitor 204 is to send payload information, the example metadata reference manager 134 extracts and/or otherwise retrieves the metadata compiled in the task process 184 to facilitate improved payload transmission between peers that may have architecture differences. In the event non-compiled (virtualized) tasks are invoked (e.g., tasks executed with the example VM 152), the example metadata reference manager 134 extracts and/or otherwise retrieves the associated metadata from the VM 152 or payload storage 108.

Figure 3A:
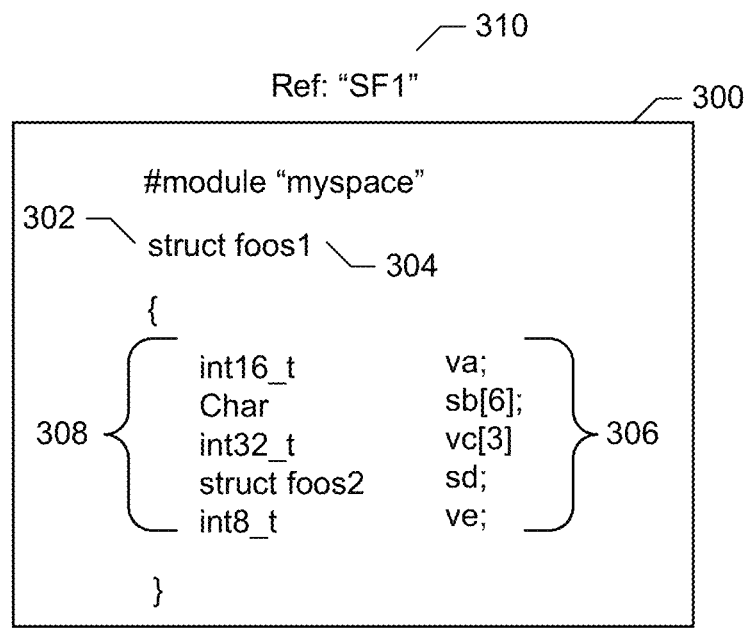
FIG. 3A is an example composite interface description (CID) constructed in accordance with the teachings of this disclosure.

FIG. 3A illustrates an example CID 300 generated by the example CID engine 120. In the illustrated example of FIG. 3A, the CID 300 includes a composite type 302 ("struct"), a composite name 304 ("foos1"), composite element names 306, and corresponding composite element types 308. As described above, the CID includes architecture agnostic textual descriptions of the composite, which is a C-structure in the illustrated example of FIG. 3A. Additionally, the example CID 300 may be stored in the example payload storage 108 as a file (e.g., a CID file), which may be a portion of the example composite metadata.

Figure 3B:
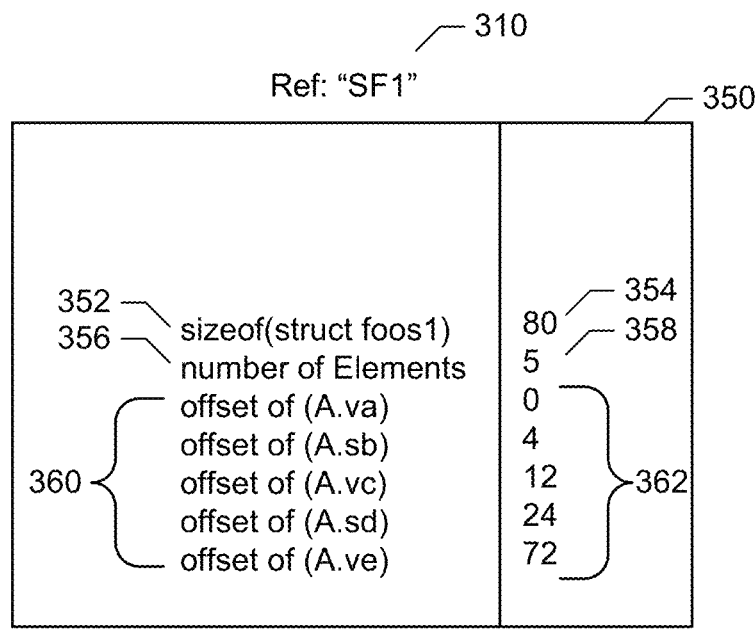
FIG. 3B is an example composite layout description (CLD) constructed in accordance with the teachings of this disclosure.

FIG. 3B illustrates an example CLD 350 generated by the example CLD engine 126. In the illustrated example of FIG. 3B, the CLD 350 includes a size identifier 352 of an example composite and a corresponding size value 354, a number of elements identifier 356 and a corresponding elements value 358, and offset identifiers 360 with corresponding binary offset values 362. Additionally, the example CLD 350 may be stored in the example payload storage 108 as a file (e.g., a CLD file), which may be a portion of the example composite metadata. Taken together, the example composite metadata includes the example CID 300 and the example CLD 350.

To build and/or otherwise generate the example CID 300, the example CID pointer manager 122 retrieves a composite associated with the task process 184 that is to be compiled by the task process compiler 186. Generally speaking, composite information, such as variable types, variable names, offset values, and/or size information are available to and/or otherwise resolved by compilers. As such, the example task process compiler 186 is of a type that is consistent and/or otherwise associated with an architecture type for the device on which a corresponding executable will execute. An example CLD structure (binary) definition handled by the example task process compiler 186 is shown below in Table 1.

TABLE 1

```
typedef struct
{
    uint16_t nbr_earfcn;
    uint16_t nbr_phys_cell_id;
    uint8_t freq_band_ind;
    uint8_t nbr_rsrp;
    uint8_t nbr_rsrq;
}CellMeasResult;
```

Additionally, the corresponding textual CID is shown below in Table 2.

TABLE 2

```
const char* CellMeasResult_cid =
"\
uint16_t nbr_earfcn;\
uint16_t nbr_phys_cell_id;\
uint8_t freq_band_ind;\
uint8_t nbr_rsrp;\
uint8_t nbr_rsrq;\
"
```

Further, the example task process compiler 186 may compile the binary CLD as shown below in Table 3.

TABLE 3

```
typedef struct
{
    uint32_t size;
    uint16_t number_of_elements;
    uint16_t offset[5];
} CellMeasResult_CLD8;
CellMeasResult_CLD8 CellMeasResult_info =
    {{sizeof(CellMeasResult),5, },
    {offsetof(CellMeasResult,nbr_earfcn),
    offsetof(CellMeasResult,nbr_phys_cell_id),
    offsetof(CellMeasResult,freq_band_ind),
    offsetof(CellMeasResult,nbr_rsrp),
    offsetof(CellMeasResult,nbr_rsrq)}}
```

The example CID file generator 124 generates a CID shell file to populate with architecture agnostic information associated with the composite, and the example CID pointer manager 122 identifies the beginning of the binary composite with a pointer to parse the composite for information for each element contained therein. For each element in the binary composite, the example CID file generator 124 encodes information to the CID 300 as text. When all elements have been encoded to the CID 300, the example CLD pointer manager 128 retrieves the composite associated with the task process 184 that is to be compiled by the task process compiler 186, and the example CLD file generator 130 generates a CLD shell file to populate with architecture specific information associated with the composite. The example payload analyzer 132 identifies a size of the composite and writes it to the CLD shell file and identifies a number of elements of the composite and writes that value to the CLD shell file (see elements 352, 354, 356 and 358) of the example CLD 350). Based on the number of elements of the composite, the example CLD pointer manager 128 increments and/or otherwise parses the composite binary a corresponding number of times to identify each element, identify its corresponding binary offset value, and the example payload analyzer 132 writes that information to the CLD shell file. In some examples, the example payload analyzer 132 determines an endianness value of the example binary composite, if available, and writes the same to the CLD shell file. In the event of any sub-composites within a composite, such sub-composites will have their own similar metadata definition(s) determined in a manner similar to the above.

The example metadata reference generator 134 sends the CID 300 and CLD 350 to the sending client device 102 as composite metadata for future use to facilitate improved data transfer/transmission to a targeted peer (e.g., the example receiving server device 104). In some examples, when the task process 184 of the sending client device is ready to transmit available payload data to a target peer, such transmission may proceed without further involvement by the example metadata engine 136. However, in the event one or more additional and/or alternate task process(es) 184 are to be provided to the example sending client device for payload data collection, then the example metadata engine 136 repeats the above disclosed examples to generate a corresponding executable and one or more instances of composite metadata (e.g., CID, CLD) for corresponding composites.

As described above, one or more task process(es) 184 are associated with virtualized languages (e.g., JAVA®, C #) rather than compiled (e.g., native) languages (e.g., C, C++). In such circumstances, the example CID and CLD are generated by reflection with cooperation from the example VM 152. For example, the metadata reference manager 134 (see the example payload engine 150 of the sending client device 102) queries the VM 152 of the sending client device 102 to determine one or more variable types and/or variable names available for the composites associated with the virtualized task process 184. Additionally, because virtual machine based languages (e.g., JAVA®, C #) do not include offset information, elements are packed back-to-back with or without padding bytes. In some examples, virtualized tasks do not need a CLD, particularly when one or more padding techniques are employed. Still further, VMs in one or more different locations (e.g., the VM 152 of the sending client device 102, the VM 152 of the receiving server device 104) may be synchronized and/or otherwise registered by the example metadata engine 136 to ensure task process consistency between two or more peers.

In response to a trigger (e.g., a request for payload data), the example task storage interface 210 of FIG. 2 determines whether the composite metadata, which includes the example CID 300 and the example CLD 350 and is associated with a particular metadata reference, has been sent to the example receiving server device 104 on a prior occasion. If not, then the example client payload engine 150 sends both (a) the native binary (e.g., a portion of the payload containing the binary composite of interest), (b) the composite metadata, and (c) a metadata reference to be used when making any future reference to the binary composite and/or its associated composite metadata. In some examples, the client payload engine 150 sends (a) the native binary and (b) the metadata reference under the assumption that any receiving peer has already received and/or otherwise has the composite metadata. If not, such as when the composite metadata has not been previously sent, or the receiving peer no longer has the previously received composite metadata, then the example receiving I/O interface 114 generates a request command. When the request command is received by the example client payload engine 150, the composite metadata is sent to the example receiving peer (e.g., the receiving server device 104).

As described in further detail below, sending the composite metadata along with the native binary allows the example receiving server device 104 to decode the native binary upon receipt, which allows computational efficiency improvements of the example sending client device 102 by avoiding encoding effort(s). Additionally, because the example sending client device 102 may send the native binary without expending encoding resources/effort, the example sending client device 102 conserves on-board power (e.g., battery) resources, consumes a lower transmission bandwidth (improves transmission efficiency) and, because native binary formats include a relatively smaller storage footprint than human readable format(s), the example sending client device 102 conserves on-board storage (e.g., on-board memory, RAM, FLASH, etc.) resources. Furthermore, in the event the example sending client device 102 changes its schema related to the composite binaries generated, sending compatibility is not disrupted between sending/receiving peers and, instead, schema updates (e.g., architecture changes, changes in binary offset values associated with composite elements, etc.) may be managed with updated composite metadata.

In some examples, the sending client device 102 has previously sent the composite metadata associated with the composite to the example receiving server device 104. Accordingly, the example receiving server device 104 already has a stored copy of (a) the composite metadata and (b) the metadata reference. Thus, rather than sending all three of the (a) composite metadata, (b) the metadata reference and (c) the composite binary, the example client payload engine 150 sends only the metadata reference and the composite binary, as described above. The example receiving server device references a previously stored copy of the composite metadata to allow the composite binary to be translated (e.g., translated into an alternate format, such as text, XML, an alternate binary associated with the receiving peer architecture, etc.).

Figure 4:
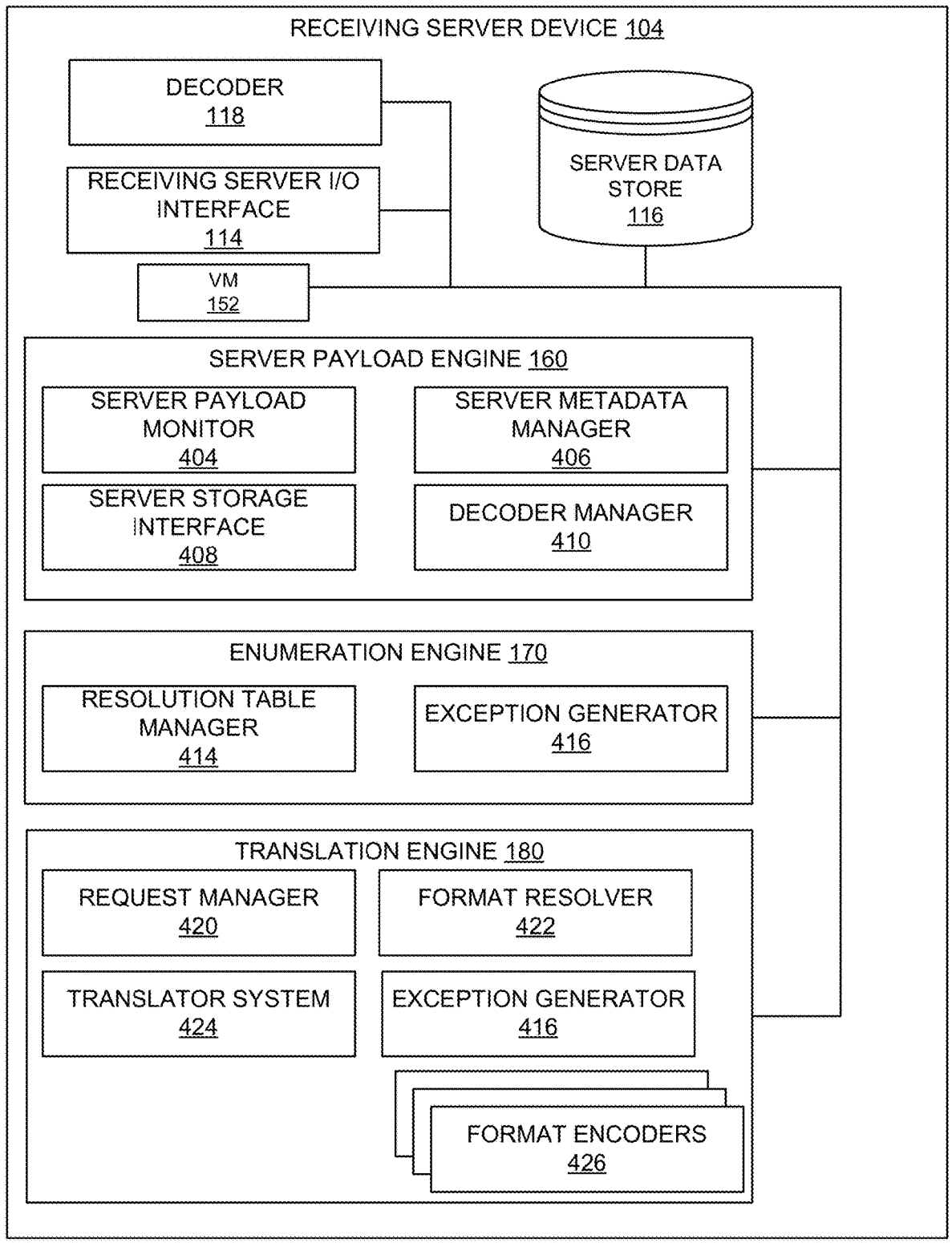
FIG. 4 is a schematic illustration of a receiving server device constructed in accordance with the teachings of this disclosure.

FIG. 4 is a schematic illustration of the example receiving server device 104 of FIG. 1A, and includes additional detail related to processing data received by the example sending client device 102. In some examples, processing data includes resolving data, such as a composite binary retrieved by a sending peer that has an architectural format that is different than the receiving peer. In the illustrated example of FIG. 4, the receiving server device 104 includes the example receiving server I/O interface 114 communicatively connected to the example network 106, the example decoder 118, the example server data store 116, and the example VM 152, as described above in connection with FIG. 1A. Additionally, the example receiving server device 104 of FIG. 4 includes the example server payload engine 160, an example server payload monitor 404, an example server metadata manager 406, an example server storage interface 408, an example decoder manager 410, an example enumeration engine 170, an example resolution table manager 414, an example exception generator 416, an example translation engine 180, an example request manager 420, an example format resolver 422, an example translator system 424, the example exception generator 416, and example format encoders 426 to, in part, encode payload data into a desired format of one or more requesting entities, such as one or more requests from the example translation request entities 182.

In operation, the example server payload monitor 404 determines whether a payload has been received via the example receiving server I/O interface 114. As described above, the example sending client device 102 may send payload data in response to a trigger, such as a trigger initiated by the example receiving server device 104. If payload information has been received, then the example server metadata manager 406 determines whether the received payload data also includes a matching composite metadata reference. As described above, when the example sending client device 102 provides composite metadata (e.g., the example CID 300 and the example CLD 350), an associated composite metadata reference is also associated, matched and/or otherwise tagged to the composite metadata for future reference. Assuming for this example that the received payload (e.g., a received binary composite, a received metadata reference, and received metadata composite information) occurs for the first time, then the example server storage interface 408 extracts the received metadata composite information to identify the corresponding CID and CLD. The extracted CID (e.g., the example CID 350 of FIG. 3A) and the extracted CLD (e.g., the example CLD 350 of FIG. 3B) are stored in the example server data store 116 and associated with the extracted metadata reference nomenclature (e.g., "SF1"). As such, in the event another binary composite is sent having the same schema (e.g., composite metadata having the same CID and the same CLD), then the example receiving server device 104 may retrieve that from the server data store 116, which conserves processing resources of the receiving server device 104 during one or more subsequent requests to obtain and/or otherwise render data stored within a requested composite. In effect, when the metadata reference from the example sending client device 102 (e.g., sending peer) matches the metadata reference from the example receiving server device 104 (e.g., receiving peer), efforts to re-build and/or otherwise populate the CID and CLD information are bypassed.

However, because the example sending client device 102 and the example receiving server device 104 may each have a unique and/or otherwise different architecture, the received payload from the sending client device 102 may not be compatible with the receiving server device 104. As such, the example server metadata manager 406 generates its own server-side CID file and server-side CLD file to accommodate for and/or otherwise resolve any architecture differences. In some examples, the server metadata manager 406 includes one or more elements as shown in FIG. 1B to generate the server-side CID file and the server-side CLD file, in which the example task process compiler is capable of compiling task processes for a particular architecture type of the example receiving server device 104. In still other examples, the server metadata manager 406 is communicatively connected to a metadata engine that is compatible with the architecture associated with the example receiving server device 104.

Figure 5:
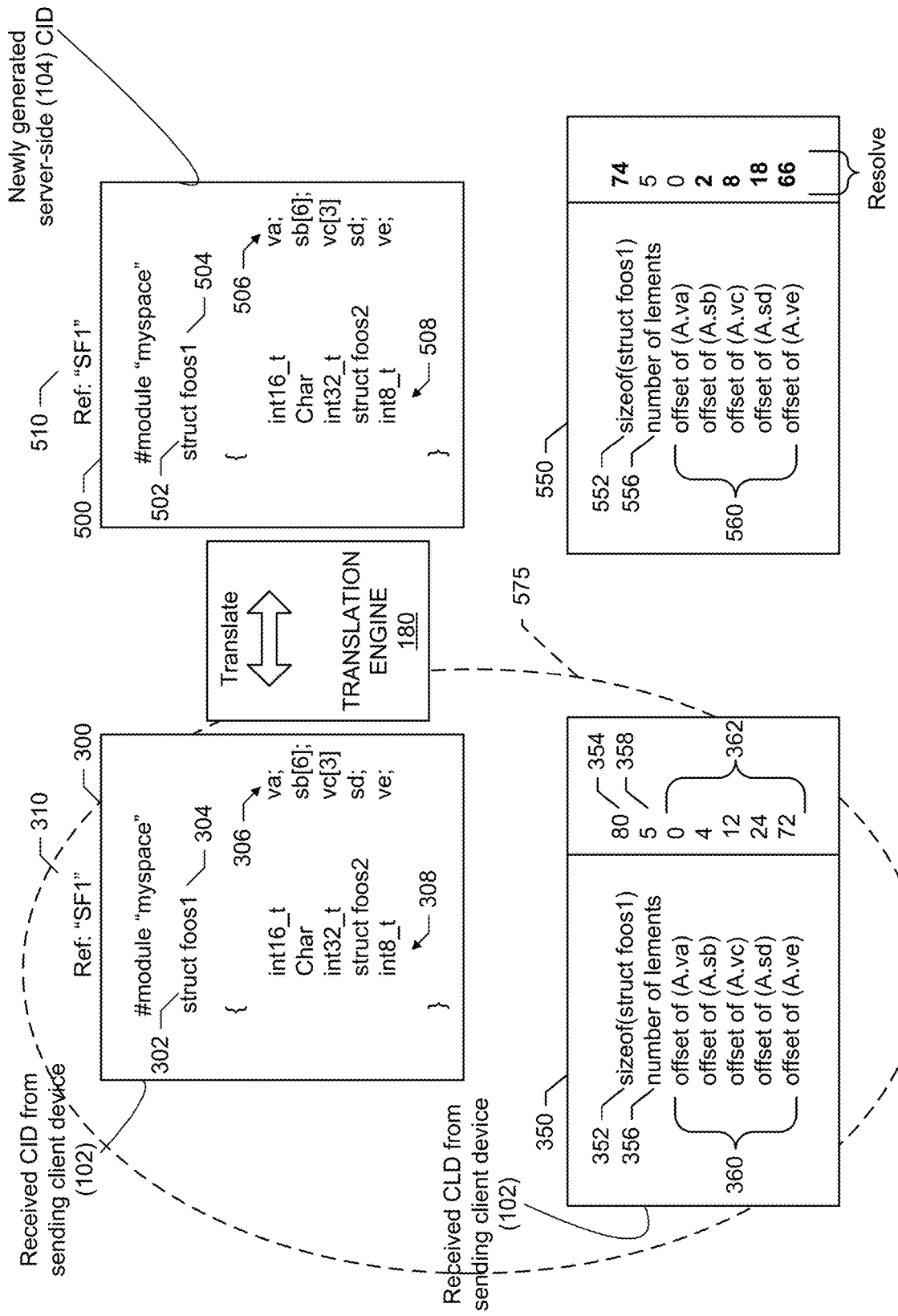
FIG. 5 illustrates example generation of a server-side CID and a server-side CLD constructed in accordance with the teachings of this disclosure.

In the illustrated example of FIG. 5, the example CID 300 generated by the example CID engine 120 has been translated by the example translation engine 180 and stored in the example server data store 116. Additionally, the example CLD 350 generated by the example CLD engine 126 has been translated by the example receiving server device 104 and stored in the example server data store 116. Taken together, the example CID 300 and the example CLD 350 produce composite metadata 575 (see dotted line). As described above in connection with FIG. 3A, the example CID 300 includes a composite type 302 ("struct"), a composite name 304 ("foos1"), composite element names 306 and corresponding composite element types 308. While the illustrated example of FIG. 5 includes a composite type of "struct," examples disclosed herein are not limited thereto. In some examples, the composite may be of type enumeration (ENUM), in which one or more elements are resolved, as described in further detail below.

The server-side CID 500 may have its own unique definition with more or less elements, in which only those matching between peers will allow translating. For those one or more elements that do not include corresponding matches between peers, they may be ignored and/or exception errors may be generated by the example exception generator 416 to convey partial decoding capabilities therebetween. When comparing and/or translation is complete, the example server-side CID 500 will also include a composite type 502, a composite name 504, composite element names 506 and corresponding composite element types 508. Additionally, the example server-side CID 500 will be associated with the same metadata reference nomenclature that was originally established by the example sending client device 102. In the illustrated example of FIG. 5, the CID 300 was associated with a metadata reference "SF1" 310, which is also attributed to the server-side CID 500 (see element 510).

As described above in connection with FIG. 3B, the example CLD 350 includes a size identifier 352 of the composite and a corresponding size value 354, a number of elements identifier 356 and a corresponding elements value 358, and offset identifiers 360 with corresponding binary offset values 362. The example server metadata manager 406 also generates the server-side CLD 550 and populates it with one or more portions of the data that translated from the received CLD 350 by the translation engine 180. In particular, when initial comparing/translation is complete, the example CLD 550 will reflect a degree of parity with the received CLD 350 by including a size identifier 552, a number of elements identifier 556, and offset identifiers 560. If the architecture of the example receiving server device 104 is dissimilar to the architecture of the sending client device 102, the example translation engine 180 determines appropriate values for the size, number of elements and/or binary offsets to be written to the example server-side CLD 550 based on a respective architecture type of the receiving server device 104.

In some examples, a mapping table resolves sender metadata and receiver metadata. In the illustrated example of FIG. 5, the translation engine 180 has determined that, based on the architecture of the receiving server device 104, the size of the binary composite is "74" (rather than a size of "80" from the sending client device 102). Similarly, the example translation engine 180 has identified particular ones of server-side CLD 550 binary offset values 562 that are to be adjusted to conform to requirements of the architecture of the receiving server device 104 (e.g., offset value of element A.sb is "4" on the sending client device 102, but is "2" on the receiving server device 104).

When the binary composite is received and/or otherwise retrieved by the example receiving server device 104 in the future (e.g., when the binary composite contains different payload data, but exhibits the same schema/composite format), then the receiving server device 104 can identify matching metadata and map to correct offset locations. In some examples, the server metadata manager 406 generates side-by-side comparison tables as shown in the illustrated example of FIG. 5 to serve as a metadata resolution table for comparison. The example translation engine 180 obtains the retrieved CID 300 and corresponding metadata reference (e.g., "SF1" 310), and queries the example server data store 116 to identify/compare a matching metadata reference (e.g., "SF1" 510). If found, the example translation engine 180 may bypass any operations to re-populate the server-side CID 500 and/or the server-side CLD 550 and, instead, retrieves the previously stored server-side CID 500 and compares them to verify parity therebetween.

When one or more differences between the retrieved CID 300 and the stored server-side CID 500 are identified, then one or more exceptions may be invoked and/or otherwise generated by the example exception generator 416 of the translation engine 180 to identify data corruption and/or data mismatch. Additionally, the example translation engine 180 obtains the retrieved CLD 350 and corresponding metadata reference (e.g., "SF1" 310), and queries the example server data store 116 to identify a matching metadata reference (e.g., "SF1" 510). If found, the example translation engine 180 retrieves the previously stored server-side CLD 550 and compares it with the retrieved CLD 350 to identify differences in offset values. Knowledge of the offset values in the retrieved CLD 350 permits the example receiving server device 104 to extract stored data within the composite binary that is associated with a particular element, and then store it in the example server data store 116 in a binary format that complies with the particular hardware architecture of the receiving server device 104.

Additionally, in the event the example receiving server device 104 is to perform a translation request that generates an alternate format of the retrieved binary composite for a translation request entity 182 (e.g., third party requestors (e.g., one of the translation request entities 182) that need the binary composite information rendered in XML), then the example server-side CLD 550 allows the example translator system 424 to retrieve the stored binary composite (e.g., in a binary format native to the receiving server device 104 rather than native to the sending client device 102), identify accurate locations within the binary for one or more elements of interest, and invoke an appropriate format encoder 426 to render payload data to the desired alternate format for further transmission/distribution. While the illustrated example of FIG. 1 shows translation request entities 182 outside the receiving server device 182 outside the receiving server device 104, some examples may include one or more translation request entities 182 within the receiving server device 104. In either case, if the translation request entities 182 have their own CID/CLD (metadata), then they are compared to any metadata associated with the sending client device 102 to resolve architectural differences, as described above.

When the request manager 420 identifies a translation request (e.g., a third party request to the example receiving server device 104 to obtain composite data in a particular format), the example format resolver 422 identifies a type of the format desired. The example format resolver 422 queries the example server data store 116 to determine whether the desired format of the requested composite is already available and, if so, the example translation engine 180 retrieves the decoded composite from storage and forwards it to the requestor via the example receiving server I/O interface 114. In some examples, the requested composite is already available because it was saved to the example server data store 116 in response to one or more prior efforts to decode the binary composite into a desired format requested by a third party translation request.

On the other hand, if the desired format of the requested composite is not available in the example server data store 116 (e.g., this is the first time a translation request has been invoked for the composite binary of interest), then the example format resolver 422 identifies a first composite element from the server-side CID 500, and identifies a corresponding composite element from the server-side CLD 550 containing an offset value associated with elements of the composite binary stored in the example server data store 116. Based on respective offset values for elements of the composite binary, the example translator system 424 obtains the data located in the composite binary and invokes a corresponding format encoder 426 to translate the data to a format associated with the requestor (e.g., translation to text, translation to XML, translation to JSON, etc.). The format encoders 426 may include any number of encoder types, each one capable of encoding into a particular format. In some examples, the translator system 424 invokes a format encoder 426 to translate from a native binary into text, a native binary into XML, a native binary into JSON, etc. As the example translation engine 180 translates each element of the target composite binary stored in the example server data store 116, it stores (e.g., in the example server data store 116) aggregated composite elements to an output file having the desired format. The example translation engine 180 then sends the translated file to the requestor via the example receiving server I/O interface 114.

Figure 6:
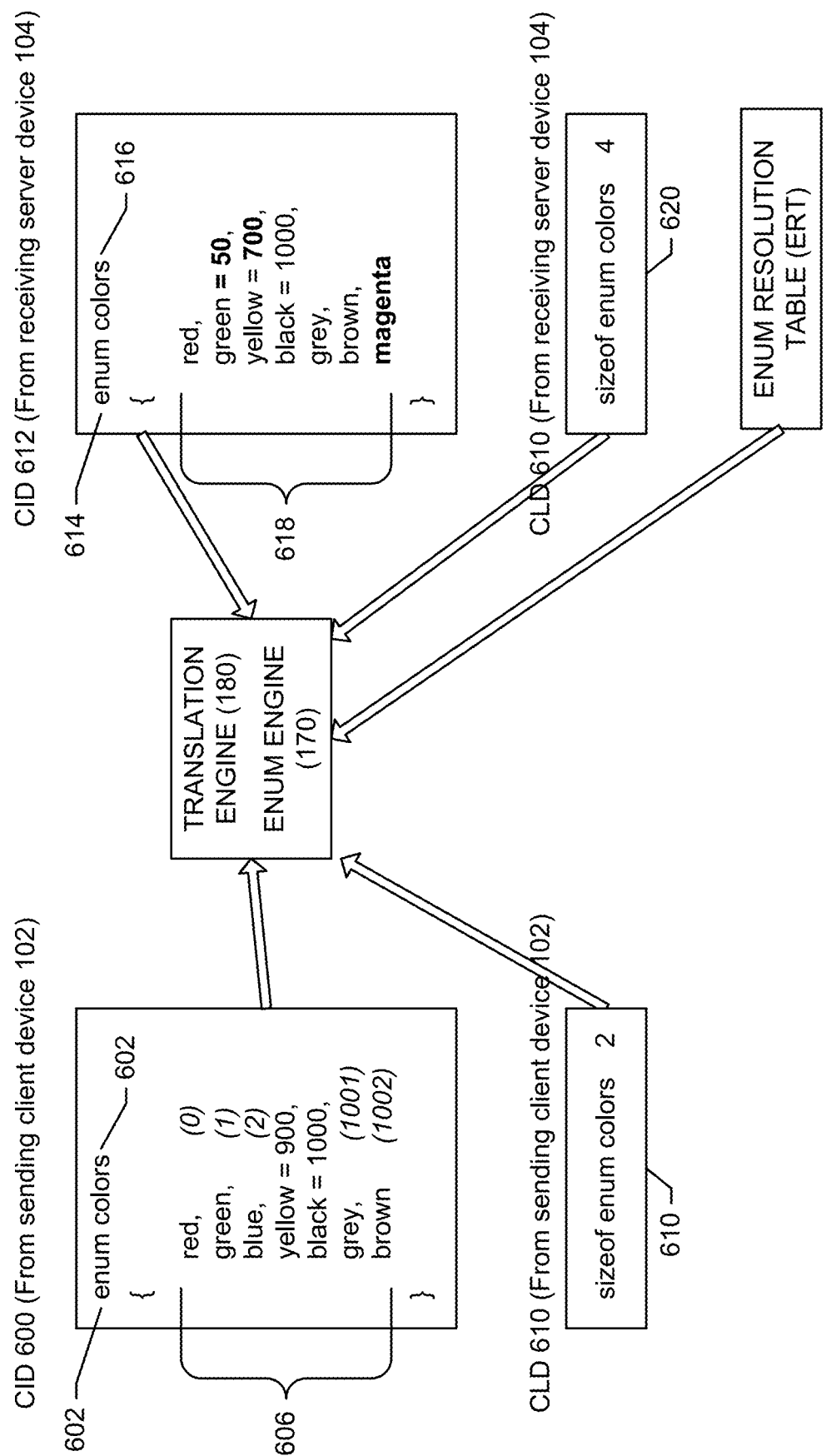
FIG. 6 illustrates an example CID and an example CLD associated with enumeration data types.

As described above, in some examples the composite is of type ENUM, which requires further resolution between elements to resolve one or more nomenclature disparities of a composite ENUM from the sending peer as compared to a composite ENUM from the receiving peer. FIG. 6 illustrates example CID and CLD tables associated with enumeration (ENUM) composite types. In some examples, the server payload monitor 404 detects a particular payload type and/or a particular type of composite stored in the payload. For example, in the event the example server payload monitor 404 detects that a received composite binary is of type ENUM, then the example enumeration engine 170 facilitates a translation of ENUM data between the received composite binary (from the example sending client device 102), and an ENUM format implemented on the example receiving server device 104. Generally speaking, while the data associated with an ENUM from the example sending client device 102 (e.g., sending peer) may be referencing the same data as an ENUM from the example receiving server device 104 (e.g., receiving peer), each of the devices may implement the ENUM with some differences in reference nomenclature. Enumeration structures represent a list of named values, which are abstracted using corresponding names in which a compiler will resolve the actual value based on the names/nomenclature. However, when communicating in a network of peers (e.g., the example sending client device 102 and the example receiving server device 104) that are not compiled together and/or have different architectures, resolution is not possible unless the ENUM is first translated into a non-binary (e.g., text) format. As discussed above, conversion from binary to one or more alternate formats results in a bloated storage footprint and computational strain during an encoding process. Thus, to allow coordination between the example sending client device 102 and the example receiving server device 104, the example enumeration engine facilitates translation therebetween while avoiding encoding overhead and/or preventing binary translation efforts when resolving one or more disparities.

In the illustrated example of FIG. 6, a CID 600 from a peer (e.g., from the sending client device 102) on the network 600 includes a composite structure of type enumeration (ENUM), as identified by a composite type identifier 602. The example CID 600 also includes an ENUM tag 604 having a name "colors." In some examples, the ENUM tag 604 is referred to as an ENUM name. The example CID 600 also includes element names 606, in which some of the elements include a corresponding target value (e.g., yellow=900, black=1000). For those elements not including an initial explicit target value (e.g., red, green, blue, etc.), an implicit value is sequentially assigned. For instance, red is assigned zero (0), green is assigned one (1), etc. In some examples, selection and/or identification of an ENUM element may occur by way of reference to an element name (e.g., "yellow"), an element target value (e.g., "900"), or an element binary position within the list of ENUM elements (e.g., "3," which refers to the fourth element in a zero-based binary list). FIG. 6 also includes a CLD 610 from the peer (e.g., from the sending client device 102), which includes information related to the size of the ENUM composite. In the illustrated example of FIG. 6, the size of the ENUM composite is "2," which reflects a byte value indicative of sixteen (16) bits. As described in further detail below, the example CID 600 and the example CLD 610 are sent to the example translation engine 180 or ENUM engine 170 in response to an instance of an ENUM composite type to be mapped.

FIG. 6 also includes a CID 612 from a separate peer (e.g., from the receiving server device 104) on the network 600. In the illustrated example of FIG. 6, the CID 612 includes an ENUM type 614 having an ENUM tag 616 named "colors," thereby indicating a match with any other ENUM composite to be mapped on the example network 600. The example CID 612 includes element names 618, in which some of the elements include a corresponding target value (e.g., green=50, yellow=700, etc.). As described above, those elements without an explicit value are sequentially assigned implicit values (e.g., red is assigned zero (0), grey is assigned one thousand and one (1001), etc.). FIG. 6 also includes a CLD 620 from the separate peer (e.g., from the receiving server device 104), which includes information related to the size of the ENUM composite. In the illustrated example of FIG. 6, the size of the ENUM composite is "4," which reflects a byte value indicative of thirty-two (32) bits. The example CID 612 and the example CLD 620 are sent to the example decoder 618 in response to an instance of an ENUM composite type to be mapped.

As described above, traditional approaches to mapping and/or otherwise resolving disparities between ENUM composite types required coordination between peers to encode and/or otherwise translate the ENUM into a standard format, which causes an original binary format to be converted into a relatively larger memory storage footprint and causes a corresponding greater bandwidth consumption, requires encoding resources, and decreases data security during a data transfer (e.g., the encoded standard type becomes human readable text). Examples disclosed herein conserve a memory storage footprint, conserve bandwidth consumption, reduce and/or eliminate encoding resources, and improve data security during a data transfer.

The example resolution table manager 114 of the example receiving server device 104 determines whether an enumeration resolution table (ERT) has previously been generated and, if not, an ERT (e.g., an initially blank shell file) is generated based on CID and CLD information sharing a matching composite tag. The example resolution table manager may save the ERT as a file in the example server data store 116. FIG. 7 illustrates an example ERT 700 populated with CID and CLD information from a pair of peers (e.g., the example sending client device 102 and the example receiving server device 104) on the example network 600. In the illustrated example of FIG. 7, the ERT 700 includes a first peer column 702 (e.g., "Peer 1") and a second peer column 704 (e.g., "Peer 2"). Additionally, for each of the example first peer column 702 and the example second peer column 704, the ERT 700 includes an example composite type identifier 706, an example composite name identifier 708, an example composite size identifier 710, and example composite element(s) identifier(s) 712. For each of the example first peer column 702 and the example second peer column 704, the example composite elements identifiers 712 include an element index column 714, an element name column 716 and an element value column 718 (e.g., a target value). Additionally, the example composite elements identifiers 712 include an element parity column 720 to identify whether composite positions for particular elements of the first and second peers match, and a secondary resolution column 722 to identify whether one or more alternate identifiers (excluding an element index position) can be used to match elements between the example first peer 702 and the example second peer 704. In other words, the example secondary resolution column 722 reflects mapping links between respective ENUM elements between the example first peer 702 and the example second peer 704.

To determine which elements match between ENUMs of the example first peer 702 and the example second peer 704, the example exception generator 416 of the ENUM engine 170 determines whether an element position mismatch occurs. In particular, the example exception generator 416 identifies a first element position of both peers (e.g., the zero "0" bits of the element index position columns 714) and determines whether a corresponding element name (e.g., the element name "red" in the element name columns 716) matches. If so, then the element associated with the evaluated element index position (e.g., index position zero "0") is deemed to be a match, in which the example resolution table manager 414 sets a value of TRUE in the example element parity column 720.

On the other hand, in the event the example exception generator 416 identifies a mismatch of an element position between peers (see row 724 of FIG. 7), then the example exception generator 416 determines if a secondary resolution parameter indicates a candidate match with a different element (e.g., a separate element having an alternate element index value). In the illustrated example of FIG. 7, index position "2" (row 724) for Peer 1 702 is associated with element name 716 "blue," but index position "2" for Peer 2 704 is associated with element name 716 "yellow," thereby indicating a mismatch. As such, the example resolution table manager 414 sets a value of FALSE in the example element parity column 720 associated with index position "2" (row 724). Despite the identified mismatch of index position "2" between the example first peer 702 and the example second peer 704, the example exception generator 416 uses a secondary resolution parameter results in a match. In particular, the example exception generator 416 uses a secondary resolution parameter of the element name "blue" from the example first peer 702 and searches all element names of the example second peer 704 for a matching element name "blue." In the illustrated example of FIG. 7, no match is identified in the example second peer 704, and the example exception generator 416 invokes an exception for any element associated with the element name "blue." While the illustrated example employs element names as the secondary resolution approach, examples disclosed herein are not limited thereto. In some examples, the primary technique to identify any differences between peers with ENUMs may employ element names only.

Despite the mismatch between the example first peer 702 and the example second peer 704 associated with the element name "blue," one or more other elements therebetween may still indicate matches that can be used to resolve differences between the ENUMs of the example first peer 702 and the example second peer 704. For example, the example exception generator 416 also identifies a mismatch of an index position between peers for index position "3" (see row 726 of FIG. 7) because the example element name "yellow" in index position "3" for the first peer 702 does not match the element name "black" in index position "3" for the second peer 704. However, when the example exception generator 416 searches alternate index positions for the element name "yellow," a match is identified in index position "2" for the second peer 704. As such, the example resolution table manager 414 populates the secondary resolution column 722 for bit position "3" with a mapping indicator that the first peer 702 matches index position "2" of the second peer 704.

When the example ERT 700 has been populated with resolved mapping information, the example enumeration engine 170 stores the ERT in the example server data store 116 in the event one or more future requests for mapping the ENUM "colors" is requested. For example, in the event the example enumeration engine 170 retrieves and/or otherwise receives a binary input query value of "1" associated with an ENUM named "colors" from the example first peer 702, then it invokes the example resolution table manager 414 to retrieve a corresponding target value for the appropriate ENUM named "colors" from the example second peer 704 by referencing the ERT 700. Because the example input query value of "1" is associated with element name "green" from the first peer 702, then a corresponding value from the second peer 704 of "50" is resolved (see row 728 of FIG. 7). While examples disclosed above illustrate a use case where the sending client device 102 is prevented from computationally intensive translations when sending payload data to the receiving server device 104, such examples are limited thereto. In some examples, the receiving server device 104 may send payload data to the sending client device 102 in a similar manner.

While an example manner of implementing the client payload engine 150, the server payload engine 160, the enumeration engine 170 and the translation engine 180 of FIG. 1 is illustrated in FIGS. 2, 3A, 3B and 4-7, one or more of the elements, processes and/or devices illustrated in FIGS. 1, 2, 3A, 3B and 4-7 may be combined, divided, re-arranged, omitted, eliminated and/or implemented in any other way. Further, the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference generator 134, the example encoder interface 208, the example task storage interface 210, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170 and the example translation engine 180 of FIGS. 1, 1B, 2 and 4 may be implemented by hardware, software, firmware and/or any combination of hardware, software and/or firmware. Thus, for example, any of the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference generator 134, the example encoder interface 208, the example task storage interface 210, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170 and the example translation engine 180 of FIGS. 1, 1B, 2 and 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sending client device 102, the example receiving server device 104, the example client task engine 103, the example payload storage 108, the example encoder 110, the example sending client I/O interface 112, the example receiving server I/O interface 114, the example server data store 116, the example decoder 118, the example metadata engine 136, the example task process compiler 186, the example VM 152, the example client payload monitor 204, the example metadata reference generator 134, the example encoder interface 208, the example task storage interface 210, the example CID engine 120, the example CID pointer manager 122, the example CID file generator 124, the example CLD engine 126, the example CLD pointer manager 128, the example payload analyzer 132, the example CLD file generator 130, the example server payload monitor 404, the example server metadata manager 406, the example server storage interface 408, the example decoder manager 410, the example resolution table manager 414, the example exception generator 416, the example request manager 420, the example format resolver 422, the example translator system 424, the example format encoders 426 and/or, more generally, the example client payload engine 150, the example server payload engine 160, the example enumeration engine 170 and the example translation engine 180 of FIGS. 1, 1B, 2 and 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example client payload engine 150, the example server payload engine 160 and/or the example enumeration engine 170 of FIG. 1 may include one or more elements, processes and/or devices in addition to, or instead of, those illustrated in FIGS. 1, 1B, 2 and/or 4, and/or may include more than one of any or all of the illustrated elements, processes and devices.

Flowcharts representative of example machine readable instructions for implementing the client payload engine 150, the server payload engine 160 and/or the enumeration engine 170 of FIGS. 1, 1B, 2 and 4 is/are shown in FIGS. 8-14. In these examples, the machine readable instructions comprise one or more programs for execution by a processor such as the processor 1512 shown in the example processor platform 1500 discussed below in connection with FIG. 15. The program(s) may be embodied in software stored on a tangible computer readable storage medium such as a CD-ROM, a floppy disk, a hard drive, a digital versatile disk (DVD), a Blu-ray disk, or a memory associated with the processor 1512, but the entire program(s) and/or parts thereof could alternatively be executed by a device other than the processor 1512 and/or embodied in firmware or dedicated hardware. Further, although the example program (s) is/are described with reference to the flowcharts illustrated in FIGS. 8-14, many other methods of implementing the example client payload engine 150, the example server payload engine 160 and/or the example enumeration engine 170 may alternatively be used. For example, the order of execution of the blocks may be changed, and/or some of the blocks described may be changed, eliminated, or combined.

As mentioned above, the example processes of FIGS. 8-14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
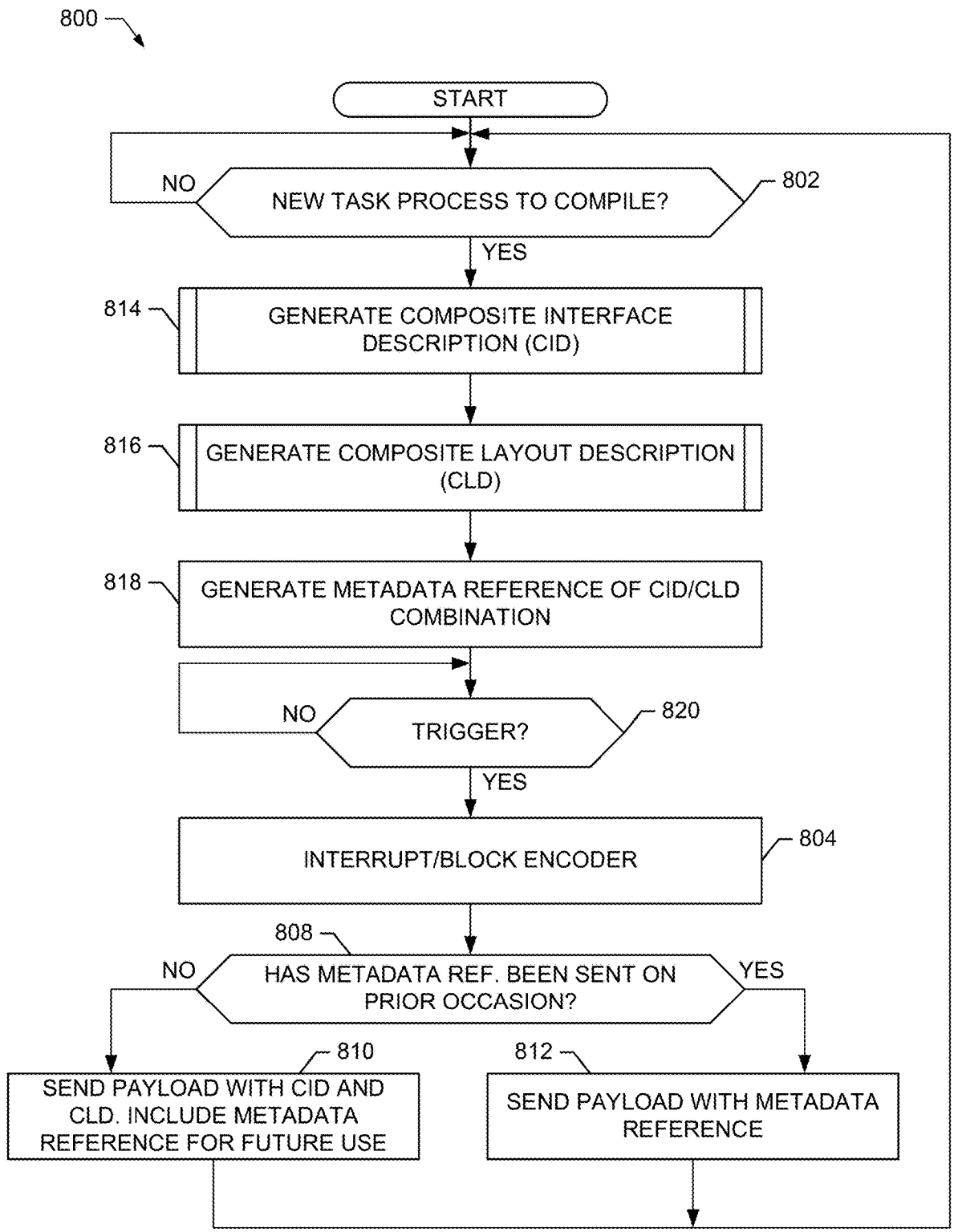
FIGS. 8-14 are flowcharts representative of example machine readable instructions that may be executed to implement the example sending client device of FIG. 2 and/or the example receiving server device of FIG. 4.

The program 800 of FIG. 8 begins at block 802 where the example interprocess communication engine 136 determines whether a new task is to be compiled. If so, the example CID engine 120 generates a CID associated with the composite binary to be sent (block 814), and the example CLD engine 126 generates a CLD associated with the composite binary to be sent (block 816). When both the example CID and CLD have been generated, the example metadata reference generator 134 generates a metadata reference associated therewith so that one or more future instances of sending the composite binary can occur without the need to re-send the CID and CLD to the target peer (block 818). The client payload monitor 204 determines whether a payload (e.g., one or more composites) is to be sent to one or more requesting devices (peers) on the network 106, such as an example receiving server device 104 (block 814). As described above, the example sending client device 102 may send payload data in response to a request from one or more peers, send payload data in response to a time-based trigger (e.g., periodic, aperiodic, scheduled, etc.), and/or send payload data in response to a condition-based trigger (e.g., threshold storage consumption value of the example payload storage 108). In some examples, an absence of a trigger results in a wait state, while in other examples the client payload engine 202 sends and/or otherwise distributes composite metadata to one or more peers so that they are ready when payload data becomes available.

To conserve computing resources of the example sending client device 102, the example encoder interface 208 interrupts and/or otherwise prevents the example encoder 110 from performing an encoding operation on the composite to be sent (block 804). As such, any composite(s) sent by the example sending client device 102 will remain in a native format (e.g., binary), which consumes a relatively smaller memory storage footprint and preserves an inherent security of the composite that is sent via the example network 106.

The example task storage interface 210 determines whether the metadata reference has been sent to the target peer on a prior occasion (block 808). As discussed above, the example client payload engine may distribute composite metadata as soon as it is available, such as when one or more peers is experiencing a relatively low computational demand. If the metadata reference has not been previously sent, then the example client payload engine 202 sends the payload (e.g., a composite within the payload) with (a) the metadata reference, (b) a CID associated with the composite, (c) a CLD associated with the composite and (d) the composite in its binary format (block 810). On the other hand, in the event the task storage interface 210 determines that the metadata reference has been sent to the target peer on a prior occasion (block 808), which means that the target peer already has received the corresponding CID and CLD associated with the composite, then the example client payload engine 202 sends only the composite in its binary format (block 812). In still other examples, the client payload engine 202 always sends the payload with the metadata reference by default. In the event the receiving peer does not have the corresponding composite metadata, then it sends a request that is acknowledged by and/or otherwise serviced by the client payload engine 202 to send the composite metadata.

Figure 9:
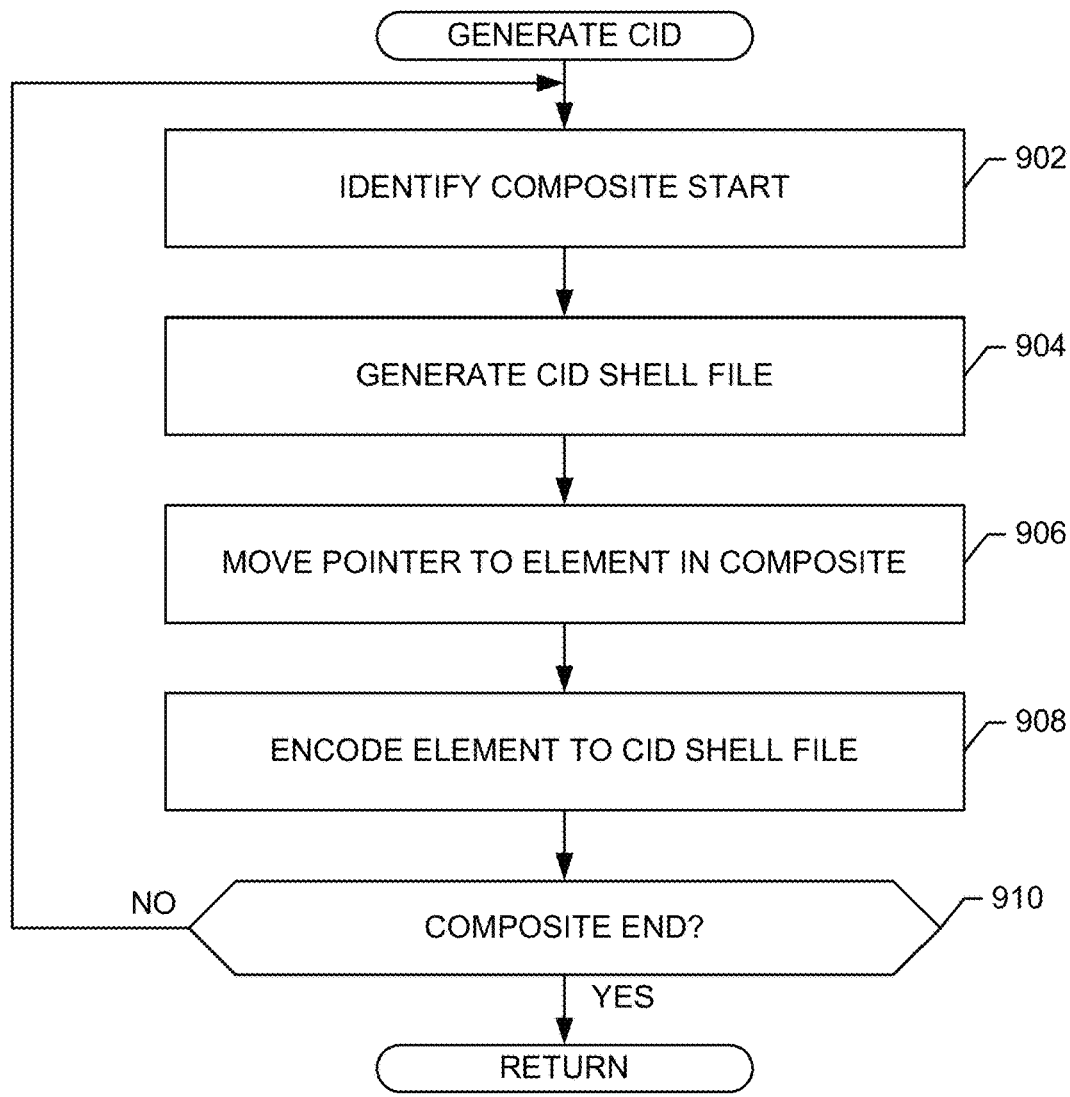

FIG. 9 illustrates additional detail for generating the CID of block 814. In the illustrated example of FIG. 9, the CID pointer manager 122 employs a parsing pointer to retrieve the composite and identify a beginning portion of the composite (block 902). The example CID file generator 124 generates a CID shell file to be populated with architecture agnostic data associated with the composite (block 904), and the example CID pointer manager 122 moves the pointer to the first element of the composite (block 906). The example CID file generator 124 encodes element data for the selected composite element to the CID shell file (block 908), and the example CID pointer manager 122 determines whether there are any remaining elements in the composite to be sent (block 910). If so, control returns to block 906 in which the example CID pointer manager 122 advances the pointer to the next element in the binary composite, otherwise the example program 814 exits.

Figure 10:
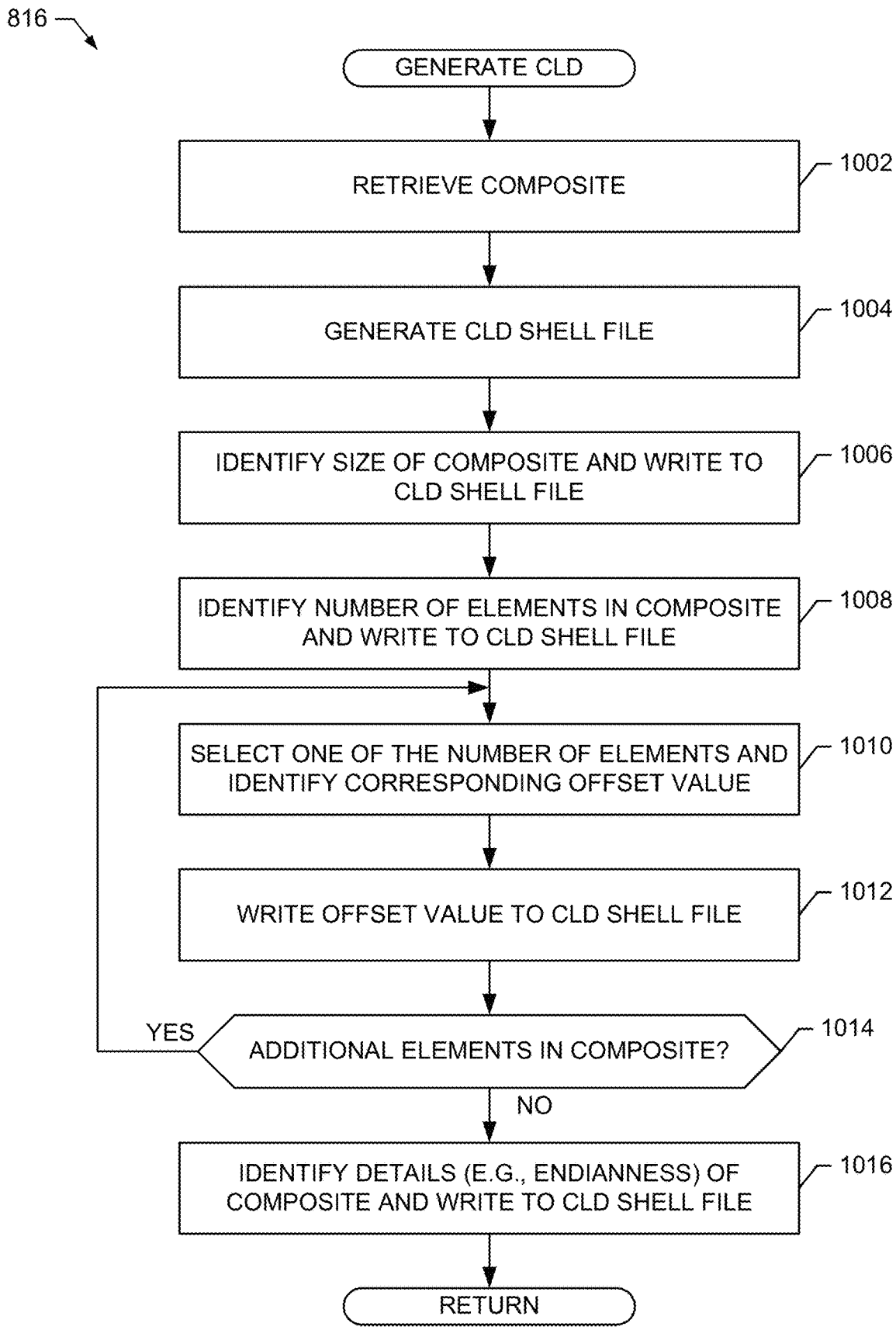

FIG. 10 illustrates additional detail for generating the CLD of block 814. In the illustrated example of FIG. 10, the example CLD pointer manager 128 retrieves the binary composite to be sent (block 1002) and the example CLD file generator 130 generates a CLD shell file to be written to with architecture specific data associated with the composite binary to be sent (block 1004). The example payload analyzer 132 identifies a size of the composite to be sent and writes this information to the example CLD shell file (block 1006), identifies a number of elements in the composite, and writes this data to the CLD shell file (block 1008). The example payload analyzer 132 selects one of the number of elements in the binary composite to determine a corresponding offset value (block 1010) and writes the corresponding offset value to the CLD shell file (block 1012). If the example CLD pointer manager 128 determines that additional elements remain in the binary composite to be analyzed (block 1014), then control returns to block 1010. If all elements have been evaluated to determine their respective offset values (block 1014), then the example payload analyzer 132 identifies additional information associated with the binary composite to be sent (e.g., endianness information, floating point information, complement information, etc.), and writes this value to the CLD shell file (block 1016). The example program 816 then exits.

Figure 11:
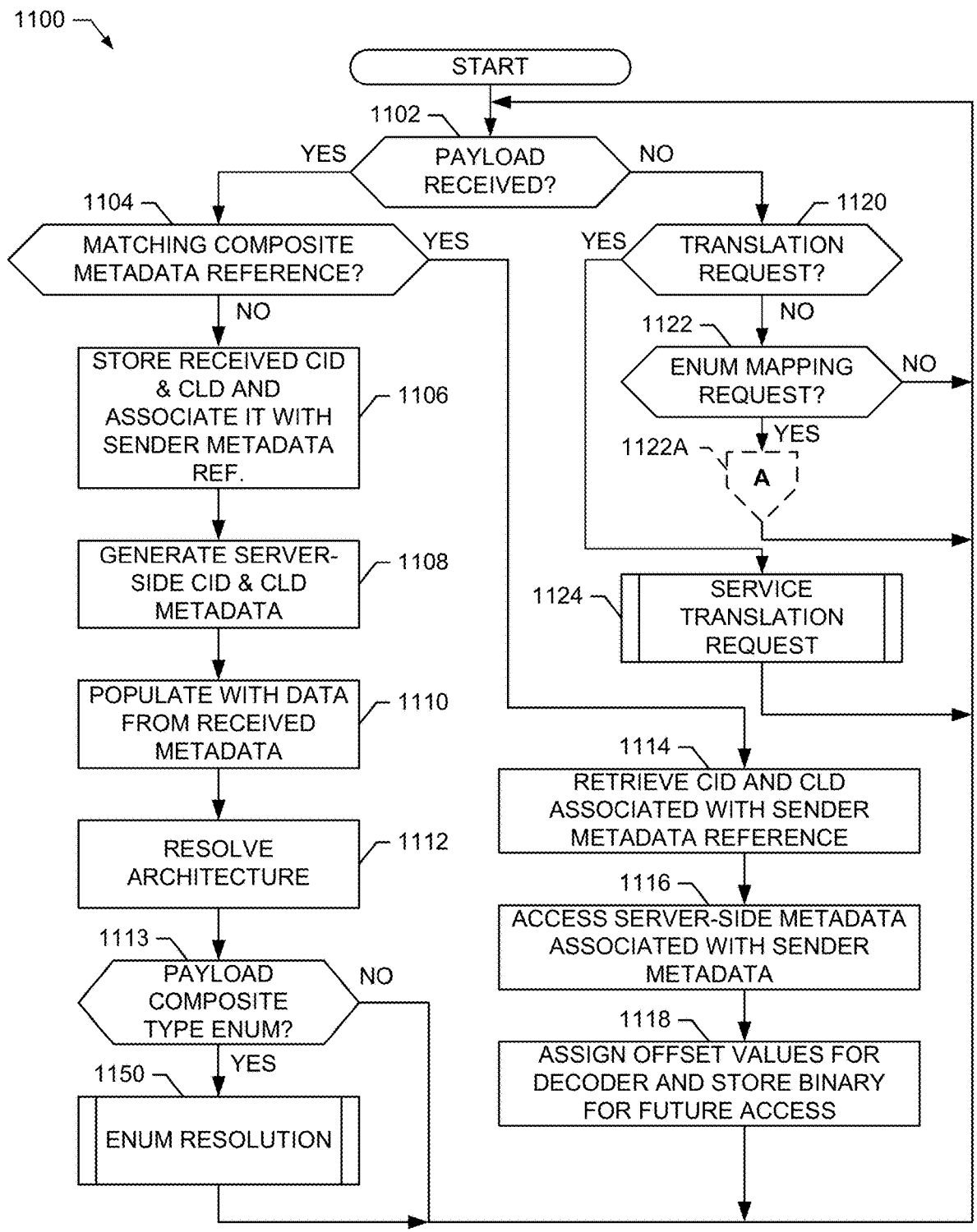

While the example programs of FIGS. 8-10 illustrate preparation of payload information (e.g., composites within the binary to be sent) by the example sending client device 102, FIG. 11 illustrates a program 1100 for handling of payload information by the example receiving server device 104. In the illustrated example of FIG. 11, the example server payload monitor 404 determines whether payload information (e.g., a binary composite from a network peer) has been received (block 1102). If so, then the example server metadata manager 406 determines whether the received payload information (e.g., a binary composite) includes a matching composite metadata reference (block 1104). If not, then this instance of receiving the payload information may be occurring for a first time, and the example server storage interface 408 extracts and stores the respective CID, CLD and associated metadata reference nomenclature to the example server data store 116 (block 1106).

So that the example receiving server device 104 can process the received payload, which includes a composite binary that may have an architecture format different than that of the example receiving server device 104, the example server metadata manager 406 generates its own server-side CID file and server-side CLD file (block 1108). Generally speaking, the server-side CID file and server-side CLD file stores corresponding metadata information associated with the sending peer (e.g., the sending client device 102) in a manner that permits resolution and mapping for architecture specific requirements of the receiving server device 104. As described above, the example server metadata manager 406 populates the server-side CID and the server-side CLD with the corresponding metadata translated and/or otherwise compared by the translation engine 180 in view of the received CID and CLD from the peer (block 1110). Based on the architecture of the receiving server device 104, the example translation engine 180 resolves architecture discrepancies by assigning each element with an offset value in the server-side CLD (block 1112). Additionally, if the example enumeration engine 170 determines that the composite is of type ENUM (block 1113), then the enumeration engine 170 resolves enumeration nomenclature discrepancies that may exist between the example sending client device 102 and the example receiving server device 104 (block 1150), as described in further detail below. Control then returns to block 1102.

Returning to block 1104, in the event that the example server metadata manager 406 includes a matching composite metadata reference, then the example server storage interface 408 retrieves the previously stored server-side CID and server-side CLD associated with the received metadata reference (block 1114). The example translator system 424 accesses the previously stored server-side metadata (e.g., the server-side CID 500 and the server-side CLD 550) as shown in FIG. 5 (block 1116). In some examples, the example translator system 424 invokes an appropriate format encoder 426 and uses the offset values from the server-side CLD 550 to store the received binary to the example server data store 116 in a format compatible with the receiving server side device 104 (block 1118). This may afford a degree of computational efficiency when repeated requests for a particular format are received by reducing future translation effort(s). On the other hand, some examples may not employ the decoder manager 410 and, instead, store the binary received from the sending client device 102 in an unaltered format for future translations, as needed. As described above, because the received composite binary is now stored in a native binary format associated with the receiving server side device 104, any future requests by one or more peers (e.g., third party clients) for translated data may be rendered via the offset mapping information of the server-side CLD 550. Control then returns to block 1102.

While the example receiving server-side device 104 has been described above with reference to a network peer (e.g., the example sending client device 102) that provides one or more composite binaries for collection, the receiving server-side device 104 also services requests from other peers (e.g., networked peers, same-platform peers, etc.) that demand a translated version of the composite binary (a translation request). As described above, translation requests originate from peer devices that may have varying preferences on the format of the composite data to be retrieved, such as plain text, XML, JSON, etc. As such, the example translation engine 180 includes any number of different format encoders 426 in the example translation engine 180 to accommodate for particular encoding type formats. Returning to block 1102, in the event a payload (e.g., a composite binary) has not been received, the example request manager 420 determines whether a translation request has occurred (block 1120). If not, then the example service payload monitor 404 determines whether an ENUM mapping request has been received (block 1122) and, if so, the example ENUM engine 170 services the ENUM mapping request (block 1420), as described in further detail below. However, in response to detecting a translation request (block 1120), then the example translation engine 180 services the request (block 1124), such as a request from one of the example translation request entities 182.

Figure 12:
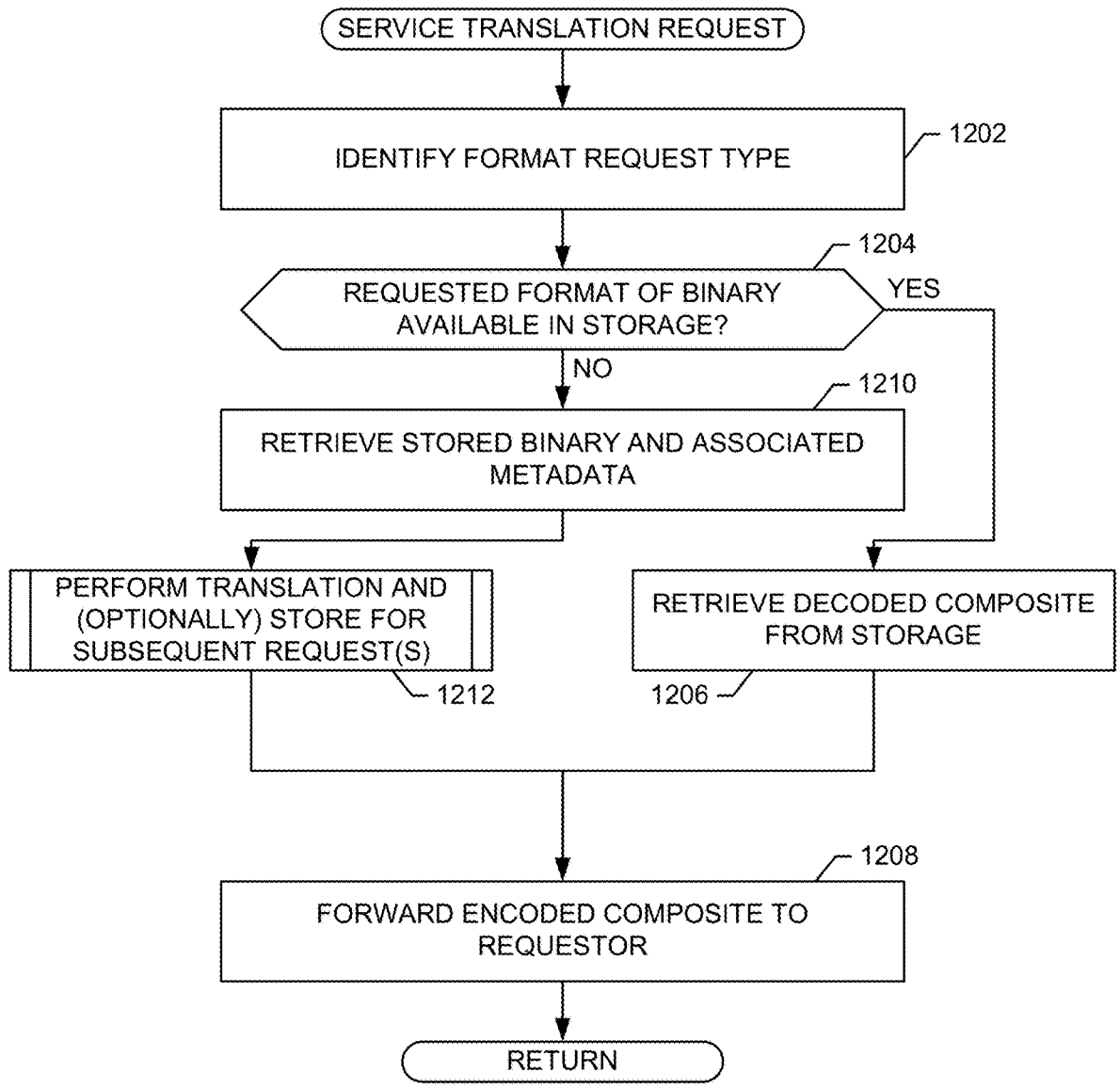

FIG. 12 includes additional detail regarding servicing the example translation request (block 1124). In the illustrated example of FIG. 12, the format resolver 422 identifies a format request type (e.g., from one of the translation request entities 182) (block 1202), and determines whether the requested format type has already been previously translated and stored in the example server data store 116 (block 1204). For example, while an example first one of the translation request entities 182 may request that a composite be formatted into XML, such translated composite information may also be optionally stored in the example server data store 116 in the event an example second one of the translation request entities 182 also requests that composite in an XML format, thereby preventing duplicative translation efforts on the example receiving server device 104. The example translation engine 180 retrieves the decoded composite from storage (e.g., the example server data store 116) (block 1206), and forwards the decoded composite to the requestor (e.g., via the example receiving server I/O interface 114) (block 1208).

Returning to block 1204, in the event the example format resolver 422 determines that the requested format is not already available in the example server data store 116, which may occur when the binary composite is translated for the first time in response to a request, then the example translator system 424 retrieves the stored binary and associated metadata (e.g., the example server-side CID 500 and server-side CLD 550 of FIG. 5) (block 1210). As described above, the binary composite may be optionally stored in the server data store 116 having a format compatible with the architecture of the receiving server device 104 so that the example translation engine 180 may reference the corresponding server-side CID 500 and server-side CLD 550 when performing translation (encoding) to the requested format type (block 1212).

Figure 13:
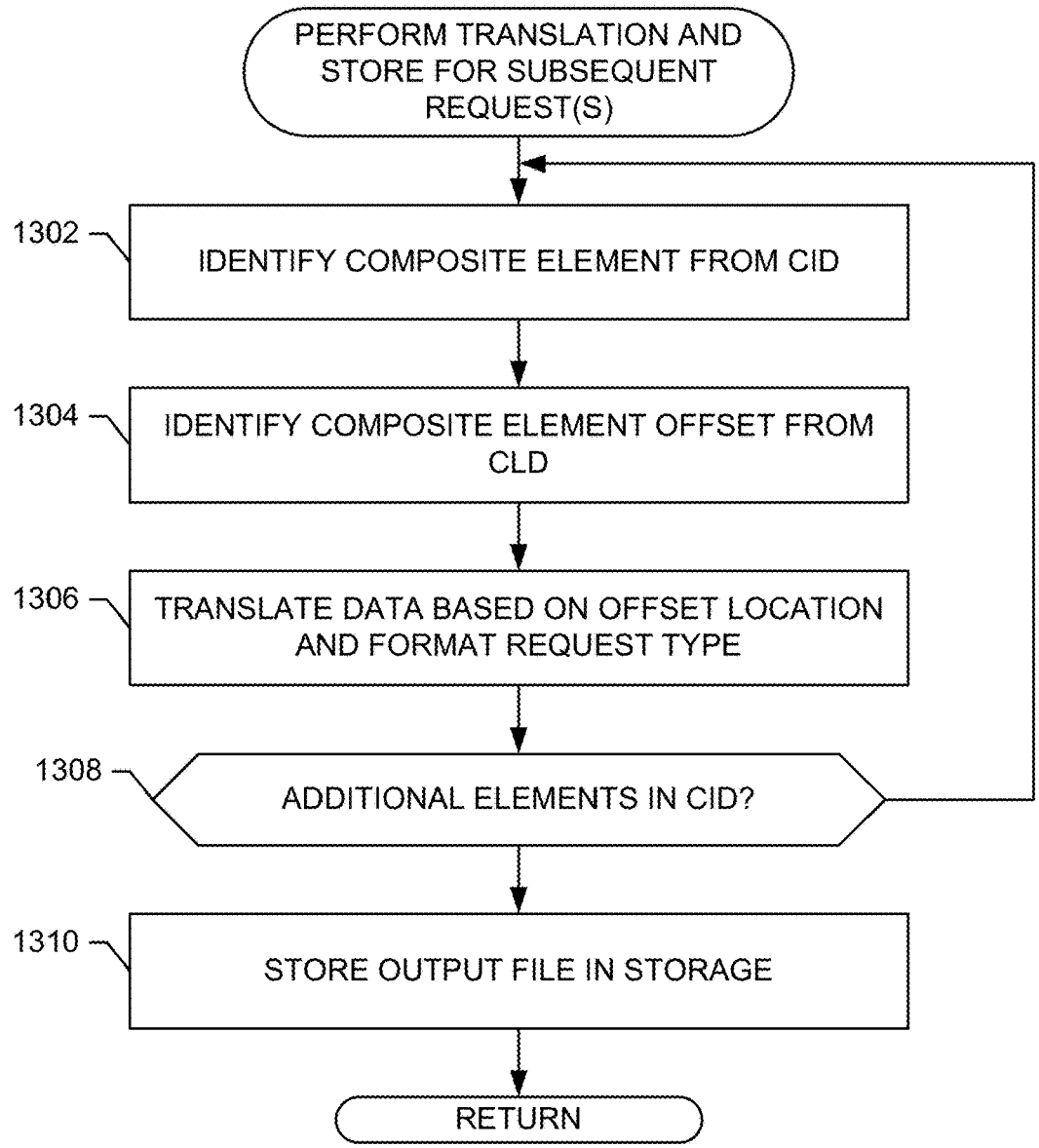

FIG. 13 illustrates additional detail for performing translation of the binary composite (block 1212). In the illustrated example of FIG. 13, the example translator system 424 identifies one of the composite elements from the server-side CID 500 (block 1302), and identifies the corresponding element from the server-side CLD 550 to determine an offset value of the data related to the element of interest (block 1304). The example translator system 424 forwards such information to a corresponding format encoder 426 to translate the data based on the offset location and format request type (block 1306), which produces data associated with the element of interest having the requested format type. The example format resolver 422 determines whether the server-side CID 500 includes additional elements of interest in the binary composite to be translated (block 1308) and, if so, control returns to block 1302. However, when all elements of the requested binary composite have been translated into the requested format, the example translation engine 180 stores the translated data in the example server data store 116 so that future requests for this binary composite may be provided to one or more requesting peers (e.g., one or more of the example translation request entities 182) without duplicative translation effort (block 1310).

Figure 14:
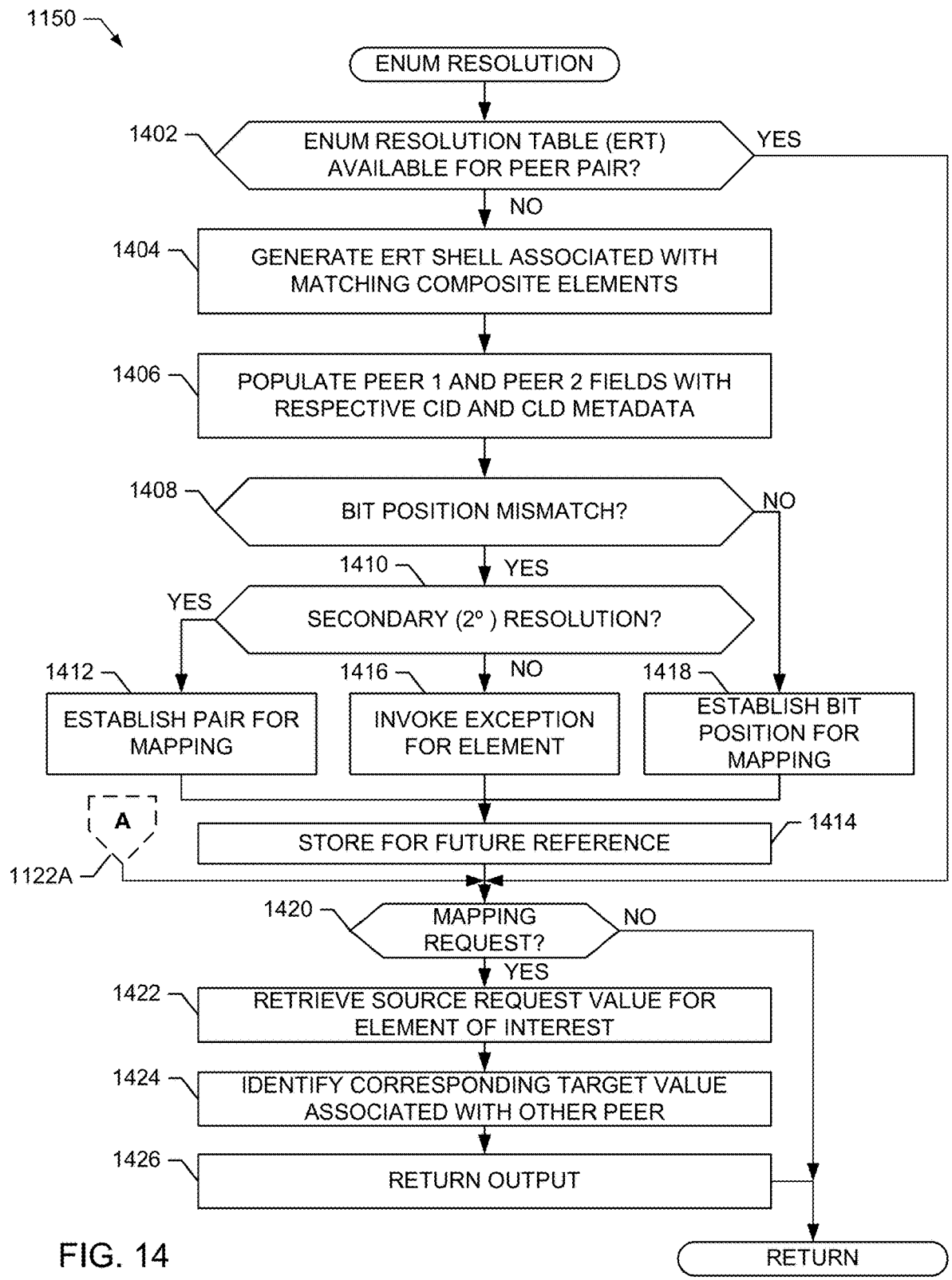

Returning to FIG. 11, in some examples when a payload composite is of type ENUM (block 1113) or when an ENUM mapping request occurs (block 1122A), the example enumeration engine 170 is invoked to resolve ENUM discrepancies (block 1150) or service mapping requests (block 1122A). FIG. 14 illustrates additional detail associated with enumeration resolution of block 1150. In the illustrated example of FIG. 14, the example resolution table manager 414 determines whether an enumeration resolution table (ERT) is already available for peer comparison (block 1402). If not, then the example resolution table manager 414 generates an ERT shell file (block 1104) and populates fields of a first peer and a second peer column of the ERT shell file with CID and CLD data associated with the respective peers (block 1106), as shown in the illustrated example of FIG. 7.

In the event the exception generator 416 of the enumeration engine 170 identifies a mismatch (e.g., an element position mismatch, an element name mismatch, an element value mismatch, etc.) between the peers (e.g., a mismatch between the ENUM element order of the example first peer 702 as compared with the ENUM element order of the example second peer 704) (block 1408), then the example exception generator 416 determines whether secondary (or other) resolution is available (block 1410). As described above, secondary resolution may be based on one or more element parameters (e.g., element names) that are common to both the example first peer 702 and the example second peer 704. If available, then the example resolution table manager 414 establishes corresponding parameters for mapping (block 1412). For example, and as shown in the illustrated example of FIG. 7, if the example first peer 702 references element "3," then despite an element position mismatch with index "3" of the example second peer 704, the corresponding matching parameter "yellow" is matched to index position "2" of the second peer 704. As such, the ENUM reference of element "3" from the first peer 702 yields a corresponding value of "700" for the second peer 704, as described in further detail below. Such mappings are stored in the example server data storage 116 for future reference (block 1414). On the other hand, in the event secondary resolution is not possible (block 1410), such as when the example first peer 702 does not have a corresponding matching element name with the example second peer 704, the example exception generator 416 invokes an exception for that particular element (block 1416).

In the event the example exception generator 416 determines that there is no mismatch (e.g., element position mismatch) between the ENUM composites of the example first peer 702 and the example second peer 704 (block 1408), then the example resolution table manager 414 establishes corresponding parameters for mapping (block 1418), and stores those mappings in the example server data storage 116 for future reference (block 1414).

While the illustrated example program 1150 of FIG. 14 generates an ERT to resolve discrepancies that may reside between ENUM composites of a first peer and a second peer, the example program 1150 also handles ENUM mapping requests when the ERT has been previously generated. For example, returning briefly to the illustrated example of FIG. 11, when the example server payload monitor 404 determines an ENUM mapping request has occurred (block 1122A), then control advances to block 1420 where the example ENUM engine 170 confirms that an ENUM mapping request is to occur. The example resolution table manager 414 retrieves a source request value for an element of interest (block 1422), such as a request to map element position "1" of the ENUM composite associated with the example first peer 702 (e.g., the example sending client device 102). The example resolution table manager 414 identifies a corresponding target value from the ERT 700 that is associated with the corresponding other ENUM composite associated with the second peer 704 (e.g., the example receiving server device 104) (block 1424). The example decoder 118 returns the target value to the requestor (block 1426), which in the illustrated example of FIG. 7 is the value "50."

Figure 15:
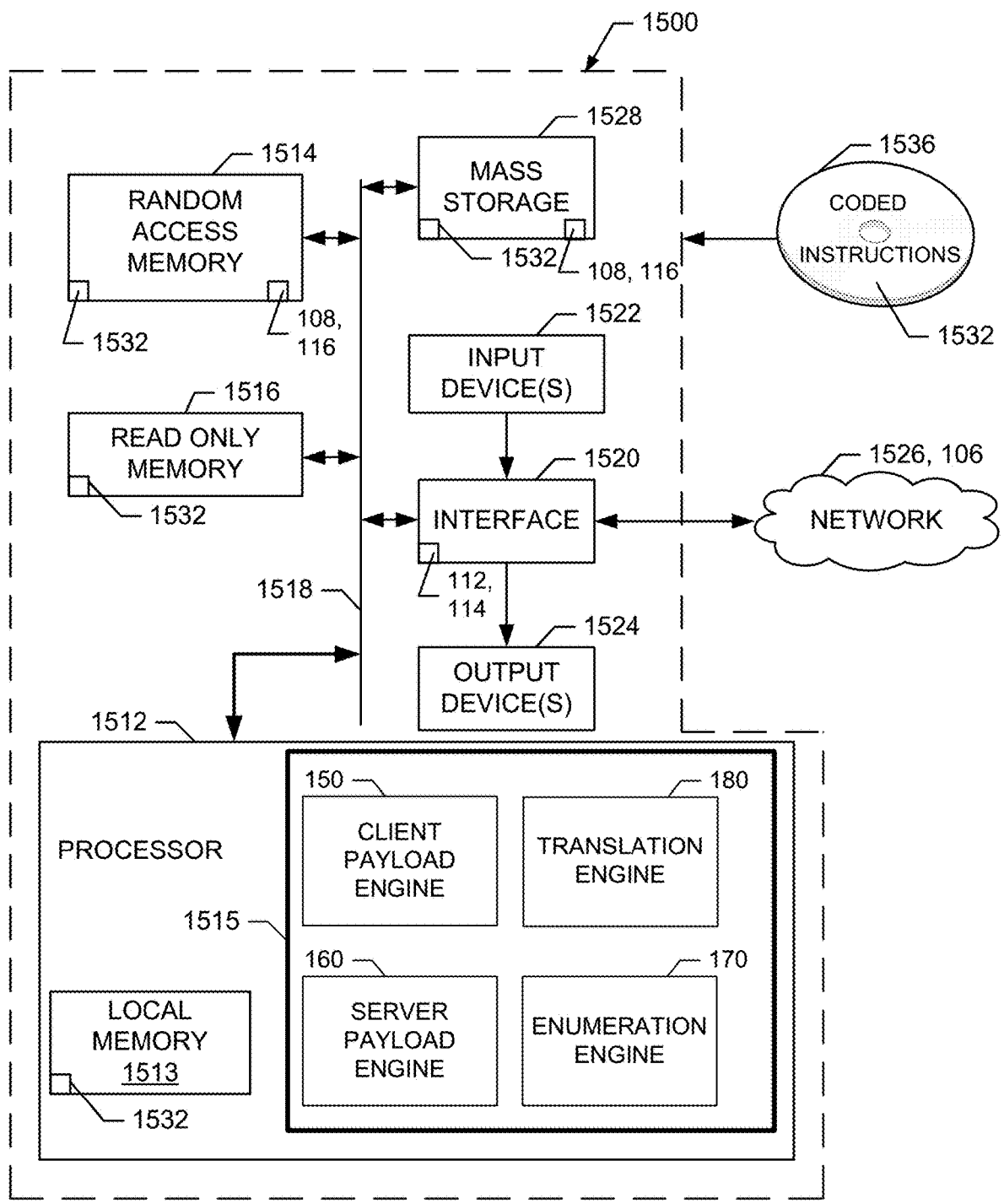
FIG. 15 is a block diagram of an example processor platform structured to execute the example machine readable instructions of FIGS. 8-14 to implement the example sending client device of FIG. 2 or the example receiving server device of FIG. 4.

FIG. 15 is a block diagram of an example processor platform 1500 capable of executing the instructions of FIGS. 8-14 to implement the client payload engine 150, the server payload engine 160, the enumeration engine 170, and the translation engine 180 of FIGS. 1, 2 and 4. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, a virtual machine, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. In the illustrated example of FIG. 15, the processor 1512 includes one or more example processing cores 1515 configured via example instructions 1532, which include the example instructions of FIGS. 8-14 to implement the example client payload engine 150, the example server payload engine 160, the example enumeration engine 170, and/or the example translation engine 180 of FIGS. 1, 2 and/or 4.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint, a voice recognition system and/or any other human-machine interface.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL) to facilitate exchange of data within a similar machine platform (e.g., a communication bus), a telephone line, coaxial cable, a cellular telephone system, etc.). In the illustrated example of FIG. 15, the interface circuit 1520 is also structured to implement one or more of the example sending client I/O interface 112 and/or the example receiving server I/O interface 114 of FIGS. 1, 2 and/or 4.

The processor platform 1500 of the illustrated example also includes a communication device such as a transmitter, a receiver, a transceiver, a modem and/or network interface card to facilitate exchange of data with external machines (e.g., computing devices of any kind) via a network 1526 and/or the network 106 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives. In some examples, the mass storage device 1530 may implement the example payload storage 108 and/or the example server data store 116.

The coded instructions 1532 of FIGS. 8-14 may be stored in the mass storage device 1528, in the volatile memory 1514, in the non-volatile memory 1516, in the local memory 1513 and/or on a removable tangible computer readable storage medium such as a CD or DVD 1536.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 is an apparatus to improve network transmission efficiency of a sending peer that includes an encoder interface to prevent an encoder from encoding data in a native format to a target format associated with a requesting peer in response to a transmission trigger, a composite interface description (CID) engine to generate architecture agnostic metadata of the data in the native format, a composite layout description (CLD) engine to generate architecture specific metadata of the data in the native format, the architecture specific metadata identifying offset values associated with elements of the data in the native format, and a client payload engine to improve the network transmission efficiency by sending unencoded data combined with the architecture agnostic metadata and the architecture specific metadata to the requesting peer having an architecture different than that of the sending peer.

Example 2 includes the subject matter of example 1, wherein the unencoded data includes a storage footprint lower than that of the data in the native format after encoding by the encoder.

Example 3 includes the subject matter of example 1, wherein the data in the native format includes a binary format.

Example 4 includes the subject matter of example 1, wherein the target format includes at least one of an extensible markup language format, an abstract syntax notation format, or a text format.

Example 5 includes the subject matter of example 1, wherein the data in the native format includes a composite associated with a type.

Example 6 includes the subject matter of example 5, wherein the type includes at least one of a C-structure or an enumeration.

Example 7 includes the subject matter of example 1, further including a pointer manager to identify a first one of the elements in the data in the native format.

Example 8 includes the subject matter of example 7, further including a CID file generator to generate a CID file to store the architecture agnostic metadata.

Example 9 includes the subject matter of example 8, wherein the CID file generator is to encode element data into the CID file.

Example 10 includes the subject matter of example 9, wherein the element data includes at least one of a composite type, a composite name, a composite element name, or a composite element type.

Example 11 includes the subject matter of example 7, further including a CLD file generator to generate a CLD file to store the architecture specific metadata.

Example 12 includes the subject matter of example 11, further including a payload analyzer to identify the offset values associated with the elements of the data in the native format, and write the offset values in the CLD file.

Example 13 includes the subject matter of example 1, further including a metadata reference manager to generate a metadata reference associated with the combined architecture agnostic metadata and the architecture specific metadata.

Example 14 includes the subject matter of example 1, further including a task process compiler to compile the architecture agnostic metadata and the architecture specific metadata into a task executable of the sending peer.

Example 15 is a method to improve network transmission efficiency of a sending peer, including preventing an encoder from encoding data in a native format to a target format associated with a requesting peer in response to a transmission trigger, generating architecture agnostic metadata of the data in the native format, generating architecture specific metadata of the data in the native format, the architecture specific metadata identifying offset values associated with elements of the data in the native format, and improving the network transmission efficiency by sending unencoded data combined with the architecture agnostic metadata and the architecture specific metadata to the requesting peer having an architecture different than that of the sending peer.

Example 16 includes the subject matter of example 15, wherein the unencoded data includes a storage footprint lower than that of the data in the native format after encoding by the encoder.

Example 17 includes the subject matter of example 15, wherein the data in the native format includes a binary format.

Example 18 includes the subject matter of example 15, wherein the target format includes at least one of an extensible markup language format, an abstract syntax notation format, or a text format.

Example 19 includes the subject matter of example 15, wherein the data in the native format includes a composite associated with a type.

Example 20 includes the subject matter of example 19, wherein the type includes at least one of a C-structure or an enumeration.

Example 21 includes the subject matter of example 15, further including identifying a first one of the elements in the data in the native format.

Example 22 includes the subject matter of example 21, further including generating a composite interface description (CID) file to store the architecture agnostic metadata.

Example 23 includes the subject matter of example 22, further including encoding element data into the CID file.

Example 24 includes the subject matter of example 23, wherein the element data includes at least one of a composite type, a composite name, a composite element name, or a composite element type.

Example 25 includes the subject matter of example 21, further including generating a composite layout description (CLD) file to store the architecture specific metadata.

Example 26 includes the subject matter of example 25, further including identifying the offset values associated with the elements of the data in the native format, and writing the offset values in the CLD file.

Example 27 includes the subject matter of example 15, further including generating a metadata reference associated with the combined architecture agnostic metadata and the architecture specific metadata.

Example 28 includes the subject matter of example 15, further including compiling the architecture agnostic metadata and the architecture specific metadata into a task executable of the sending peer.

Example 29 is a tangible computer readable storage medium comprising computer readable instructions which, when executed, cause a processor to at least prevent an encoder from encoding data in a native format to a target format associated with a requesting peer in response to a transmission trigger, generate architecture agnostic metadata of the data in the native format, generate architecture specific metadata of the data in the native format, the architecture specific metadata identifying offset values associated with elements of the data in the native format, and improve the network transmission efficiency by sending unencoded data combined with the architecture agnostic metadata and the architecture specific metadata to the requesting peer having an architecture different than that of the sending peer.

Example 30 includes the subject matter of example 29, wherein the instructions are to cause the processor to transmit the unencoded data in a storage footprint lower than that of the data in the native format after encoding by the encoder.

Example 31 includes the subject matter of example 29, wherein the instructions are to cause the processor to transmit the native format as a binary format.

Example 32 includes the subject matter of example 29, wherein the instructions are to cause the processor to identify a first one of the elements in the data in the native format.

Example 33 includes the subject matter of example 32, wherein the instructions are to cause the processor to generate a composite interface description (CID) file to store the architecture agnostic metadata.

Example 34 includes the subject matter of example 33, wherein the instructions are to cause the processor to encode element data into the CID file.

Example 35 includes the subject matter of example 32, wherein the instructions are to cause the processor to generate a composite layout description (CLD) file to store the architecture specific metadata.

Example 36 includes the subject matter of example 35, wherein the instructions are to cause the processor to identify the offset values associated with the elements of the data in the native format, and write the offset values in the CLD file.

Example 37 includes the subject matter of example 29, wherein the instructions are to cause the processor to generate a metadata reference associated with the combined architecture agnostic metadata and the architecture specific metadata.

Example 38 includes the subject matter of example 29, wherein the instructions are to cause the processor to compile the architecture agnostic metadata and the architecture specific metadata into a task executable of the sending peer.

Example 39 is a system to improve network transmission efficiency of a sending peer, including means for preventing an encoder from encoding data in a native format to a target format associated with a requesting peer in response to a transmission trigger, means for generating architecture agnostic metadata of the data in the native format, means for generating architecture specific metadata of the data in the native format, the architecture specific metadata identifying offset values associated with elements of the data in the native format, and means for improving the network transmission efficiency by sending unencoded data combined with the architecture agnostic metadata and the architecture specific metadata to the requesting peer having an architecture different than that of the sending peer.

Example 40 includes the subject matter of example 39, wherein the unencoded data includes a storage footprint lower than that of the data in the native format after encoding by the encoder.

Example 41 includes the subject matter of example 39, wherein the data in the native format includes a binary format.

Example 42 includes the subject matter of example 39, wherein the target format includes at least one of an extensible markup language format, an abstract syntax notation format, or a text format.

Example 43 includes the subject matter of example 39, wherein the data in the native format includes a composite associated with a type.

Example 44 includes the subject matter of example 43, wherein the type includes at least one of a C-structure or an enumeration.

Example 45 includes the subject matter of example 39, further including means for identifying a first one of the elements in the data in the native format.

Example 46 includes the subject matter of example 45, further including means for generating a composite interface description (CID) file to store the architecture agnostic metadata.

Example 47 includes the subject matter of example 46, wherein the means for generating a CID file is to encode element data into the CID file.

Example 48 includes the subject matter of example 47, wherein the element data includes at least one of a composite type, a composite name, a composite element name, or a composite element type.

Example 49 includes the subject matter of example 45, further including a means for generating a composite layout description (CLD) file to store the architecture specific metadata.

Example 50 includes the subject matter of example 49, further including means for identifying the offset values associated with the elements of the data in the native format, and means for writing the offset values in the CLD file.

Example 51 includes the subject matter of example 39, further including means for generating a metadata reference associated with the combined architecture agnostic metadata and the architecture specific metadata.

Example 52 includes the subject matter of example 39, further including means for compiling the architecture agnostic metadata and the architecture specific metadata into a task executable of the sending peer.

Example 53 is an example apparatus to resolve data retrieved by a receiving peer having an incompatible architectural format, including a server storage interface to retrieve: a composite having the incompatible architectural format, a client-side composite interface description (CID) having architecture agnostic metadata associated with the composite, and a client-side composite layout description (CLD) having architecture specific metadata associated with the composite, a server metadata manager to: encode a server-side CID with the architecture agnostic metadata of the client-side CID, encode a server-side CLD with the architecture specific metadata of the client-side CLD, and a translation engine to generate offset values for respective elements of the server-side CLD based on an architecture type of the receiving peer.

Example 54 includes the subject matter of example 53, further including a request manager to detect a request to render the data having the incompatible architectural format.

Example 55 includes the subject matter of example 54, further including a format resolver to identify a format type of the request.

Example 56 includes the subject matter of example 55, further including a translation engine to translate the respective elements of the data retrieved by the receiving peer based on (a) respective offset values of the respective elements and (b) the format type of the request.

Example 57 includes the subject matter of example 56, wherein the translation engine is to forward the translated respective elements of the data to a requestor of the request.

Example 58 includes the subject matter of example 54, wherein the server storage interface is to reduce a computational demand of the receiving peer during a subsequent request by associating the client-side CID and the client-side CLD with a receiving peer metadata reference.

Example 59 includes the subject matter of example 53, wherein the server storage interface is to associate the server-side CID and the server-side CLD with the receiving peer metadata reference.

Example 60 includes the subject matter of example 59, wherein the server metadata manager is to improve a computational efficiency of the receiving peer by bypassing encoding of the server-side CID and the server-side CLD when the data retrieved by the receiving peer includes a sending peer metadata reference that matches the receiving peer metadata reference.

Example 61 includes the subject matter of example 60, wherein the server metadata manager is to retrieve the server-side CID and the server-side CLD from a local storage when the sending peer metadata reference matches the receiving peer metadata reference.

Example 62 is a method to resolve data retrieved by a receiving peer having an incompatible architectural format, including retrieving a composite having the incompatible architectural format, a client-side composite interface description (CID) having architecture agnostic metadata associated with the composite, and a client-side composite layout description (CLD) having architecture specific metadata associated with the composite, encoding a server-side CLD with the architecture agnostic metadata of the client-side CID, and encoding a server side CLD with the architecture specific metadata of the client-side CLD, and generating offset values for respective elements of the server-side CLD based on an architecture type of the receiving peer.

Example 63 includes the subject matter of example 62, further including detecting a request to render the data having the incompatible architectural format.

Example 64 includes the subject matter of example 63, further including identifying a format type of the request.

Example 65 includes the subject matter of example 64 further including translating the respective elements of the data retrieved by the receiving peer based on (a) respective offset values of the respective elements and (b) the format type of the request.

Example 66 includes the subject matter of example 65, further including forwarding the translated respective elements of the data to a requestor of the request.

Example 67 includes the subject matter of example 63, further including reducing a computational demand of the receiving peer during a subsequent request by associating the client-side CID and the client-side CLD with a receiving peer metadata reference.

Example 68 includes the subject matter of example 62, further including associating the server-side CID and the server-side CLD with the receiving peer metadata reference.

Example 69 includes the subject matter of example 68, further including improving a computational efficiency of the receiving peer by bypassing encoding of the server-side CID and the server-side CLD when the data retrieved by the receiving peer includes a sending peer metadata reference that matches the receiving peer metadata reference.

Example 70 includes the subject matter of example 69, further including retrieving the server-side CID and the server-side CLD from a local storage when the sending peer metadata reference matches the receiving peer metadata reference.

Example 71 is a tangible computer readable storage medium comprising computer readable instructions which, when executed, cause a processor to at least retrieve a composite having the incompatible architectural format, a client-side composite interface description (CID) having architecture agnostic metadata associated with the composite, and a client-side composite layout description (CLD) having architecture specific metadata associated with the composite, encode a server-side CLD with the architecture agnostic metadata of the client-side CID, and encode a server side CLD with the architecture specific metadata of the client-side CLD, and generate offset values for respective elements of the server-side CLD based on an architecture type of the receiving peer.

Example 72 includes the subject matter of example 71, wherein the instructions are to cause the processor to detect a request to render the data having the incompatible architectural format.

Example 73 includes the subject matter of example 72, wherein the instructions are to cause the processor to identify a format type of the request.

Example 74 includes the subject matter of example 73, wherein the instructions are to cause the processor to translate the respective elements of the data retrieved by the receiving peer based on (a) respective offset values of the respective elements and (b) the format type of the request.

Example 75 includes the subject matter of example 74, wherein the instructions are to cause the processor to forward the translated respective elements of the data to a requestor of the request.

Example 76 includes the subject matter of example 72, wherein the instructions are to cause the processor to reduce a computational demand of the receiving peer during a subsequent request by associating the client-side CID and the client-side CLD with a receiving peer metadata reference.

Example 77 includes the subject matter of example 71, wherein the instructions are to cause the processor to associate the server-side CID and the server-side CLD with the receiving peer metadata reference.

Example 78 includes the subject matter of example 77, wherein the instructions are to cause the processor to improve a computational efficiency of the receiving peer by bypassing encoding of the server-side CID and the server-side CLD when the data retrieved by the receiving peer includes a sending peer metadata reference that matches the receiving peer metadata reference.

Example 79 includes the subject matter of example 78, wherein the instructions are to cause the processor to retrieve the server-side CID and the server-side CLD from a local storage when the sending peer metadata reference matches the receiving peer metadata reference.

Example 80 is a system to resolve data retrieved by a receiving peer having an incompatible architectural format, including means for retrieving a composite having the incompatible architectural format, means for retrieving a client-side composite interface description (CID) having architecture agnostic metadata associated with the composite, means for retrieving a client-side composite layout description (CLD) having architecture specific metadata associated with the composite, means for encoding a server-side CLD with the architecture agnostic metadata of the client-side CID, and means for encoding a server side CLD with the architecture specific metadata of the client-side CLD, and means for generating offset values for respective elements of the server-side CLD based on an architecture type of the receiving peer.

Example 81 includes the subject matter of example 80, further including means for detecting a request to render the data having the incompatible architectural format.

Example 82 includes the subject matter of example 81, further including means for identifying a format type of the request.

Example 83 includes the subject matter of example 82, further including means for translating the respective elements of the data retrieved by the receiving peer based on (a) respective offset values of the respective elements and (b) the format type of the request.

Example 84 includes the subject matter of example 83, further including means for forwarding the translated respective elements of the data to a requestor of the request.

Example 85 includes the subject matter of example 81, further including means for reducing a computational demand of the receiving peer during a subsequent request by associating the client-side CID and the client-side CLD with a receiving peer metadata reference.

Example 86 includes the subject matter of example 80, further including means for associating the server-side CID and the server-side CLD with the receiving peer metadata reference.

Example 87 includes the subject matter of example 86, further including means for improving a computational efficiency of the receiving peer by bypassing encoding of the server-side CID and the server-side CLD when the data retrieved by the receiving peer includes a sending peer metadata reference that matches the receiving peer metadata reference.

Example 88 includes the subject matter of example 87, further including means for retrieving the server-side CID and the server-side CLD from a local storage when the sending peer metadata reference matches the receiving peer metadata reference.

Example 89 is an apparatus to prevent binary translation of a sending peer enumeration (ENUM) composite, including a server storage interface to retrieve sending peer metadata associated with the sending peer ENUM composite, a resolution table manager to generate an enumeration resolution table (ERT) to compare the sending peer metadata with receiving peer metadata associated with a receiving peer ENUM composite, and an exception generator to improve receiving peer computation demands by preventing translation of the sending peer ENUM composite by identifying matching elements based on respective element index positions of (a) the sending peer metadata and (b) the receiving peer metadata.

Example 90 includes the subject matter of example 89, wherein the resolution table manager is to identify respective target values of a receiving peer ENUM composite based on a mapping request value associated with the sending peer ENUM composite.

Example 91 includes the subject matter of example 90, wherein the exception generator is to identify a mismatch of one of the respective element index positions between (a) the sending peer metadata and (b) the receiving peer metadata.

Example 92 includes the subject matter of example 91, wherein the exception generator is to identify a secondary resolution parameter in response to identifying the mismatch.

Example 93 includes the subject matter of example 92, wherein the second resolution parameter includes an element name that is common to (a) the sending peer metadata and (b) the receiving peer metadata.

Example 94 includes the subject matter of example 91, wherein the resolution table manager establishes a mapping link between the sending peer ENUM composite and the receiving peer ENUM composite based on the secondary resolution parameter.

Example 95 includes the subject matter of example 91, wherein the exception generator is to invoke an exception for a respective element that includes (a) the mismatch and (b) no available secondary resolution parameter.

Example 96 is a method to prevent binary translation of a sending peer enumeration (ENUM) composite, including retrieving sending peer metadata associated with the sending peer ENUM composite, generating an enumeration resolution table (ERT) to compare the sending peer metadata with receiving peer metadata associated with a receiving peer ENUM composite, and improving receiving peer computation demands by preventing translation of the sending peer ENUM composite by identifying matching elements based on respective element index positions of (a) the sending peer metadata and (b) the receiving peer metadata.

Example 97 includes the subject matter of example 96, further including identifying respective target values of a receiving peer ENUM composite based on a mapping request value associated with the sending peer ENUM composite.

Example 98 includes the subject matter of example 96, further including identifying a mismatch of one of the respective element index positions between (a) the sending peer metadata and (b) the receiving peer metadata.

Example 99 includes the subject matter of example 98, further including identifying a secondary resolution parameter in response to identifying the mismatch.

Example 100 includes the subject matter of example 99, wherein the second resolution parameter includes an element name that is common to (a) the sending peer metadata and (b) the receiving peer metadata.

Example 101 includes the subject matter of example 98, further including establishing a mapping link between the sending peer ENUM composite and the receiving peer ENUM composite based on the secondary resolution parameter.

Example 102 includes the subject matter of example 98, further including invoking an exception for a respective element that includes (a) the mismatch and (b) no available secondary resolution parameter.

Example 103 is a tangible computer readable storage medium comprising computer readable instructions which, when executed, cause a processor to at least retrieve sending peer metadata associated with the sending peer ENUM composite, generate an enumeration resolution table (ERT) to compare the sending peer metadata with receiving peer metadata associated with a receiving peer ENUM composite, and improve receiving peer computation demands by preventing translation of the sending peer ENUM composite by identifying matching elements based on respective element index positions of (a) the sending peer metadata and (b) the receiving peer metadata.

Example 104 includes the subject matter of example 103, wherein the instructions are to cause the processor to identify respective target values of a receiving peer ENUM composite based on a mapping request value associated with the sending peer ENUM composite.

Example 105 includes the subject matter of example 103, wherein the instructions are to cause the processor to identify a mismatch of one of the respective element index positions between (a) the sending peer metadata and (b) the receiving peer metadata.

Example 106 includes the subject matter of example 105, wherein the instructions are to cause the processor to identify a secondary resolution parameter in response to identifying the mismatch.

Example 107 includes the subject matter of example 106, wherein the instructions are to cause the processor to include an element name of the second resolution parameter that is common to (a) the sending peer metadata and (b) the receiving peer metadata.

Example 108 includes the subject matter of example 105, wherein the instructions are to cause the processor to establish a mapping link between the sending peer ENUM composite and the receiving peer ENUM composite based on the secondary resolution parameter.

Example 109 includes the subject matter of example 105, wherein the instructions are to cause the processor to invoke an exception for a respective element that includes (a) the mismatch and (b) no available secondary resolution parameter.

Example 110 is a system to prevent binary translation of a sending peer enumeration (ENUM) composite, including means for retrieving sending peer metadata associated with the sending peer ENUM composite, means for generating an enumeration resolution table (ERT) to compare the sending peer metadata with receiving peer metadata associated with a receiving peer ENUM composite, and means for improving receiving peer computation demands by preventing translation of the sending peer ENUM composite by identifying matching elements based on respective element index positions of (a) the sending peer metadata and (b) the receiving peer metadata.

Example 111 includes the subject matter of example 110, further including means for identifying respective target values of a receiving peer ENUM composite based on a mapping request value associated with the sending peer ENUM composite.

Example 112 includes the subject matter of example 110, further including means for identifying a mismatch of one of the respective element index positions between (a) the sending peer metadata and (b) the receiving peer metadata.

Example 113 includes the subject matter of example 112, further including means for identifying a secondary resolution parameter in response to identifying the mismatch.

Example 114 includes the subject matter of example 113, wherein the second resolution parameter includes an element name that is common to (a) the sending peer metadata and (b) the receiving peer metadata.

Example 115 includes the subject matter of example 112, further including means for establishing a mapping link between the sending peer ENUM composite and the receiving peer ENUM composite based on the secondary resolution parameter.

Example 116 includes the subject matter of example 112, further including means for invoking an exception for a respective element that includes (a) the mismatch and (b) no available secondary resolution parameter.

What is claimed is:

1. An apparatus to reduce network transmission bandwidth of a sending peer, comprising:
    an encoder interface to prevent an encoder from encoding data from a native format to a target format associated with a requesting peer in response to an initial transmission trigger from the requesting peer;
    a metadata reference manager to:
        retrieve architecture agnostic metadata corresponding to the data based on the native format; and
        retrieve architecture specific metadata corresponding to the data based on the native format, the architecture specific metadata including offset values and descriptions of portions of the data, the portions including elements of the data in the native format; and
    a client payload engine to reduce the network transmission bandwidth by sending the data in the native format combined with the architecture agnostic metadata and the architecture specific metadata to the requesting peer, the architecture agnostic metadata and the architecture specific metadata to facilitate translation of the data in the native format into the target format by the requesting peer, the requesting peer having an architecture different than that of the sending peer, at least one of the encoder interface, the metadata reference manager or the client payload engine including a processor.

2. An apparatus as defined in claim 1, wherein the data in the native format includes a storage footprint smaller than that of the data in the native format after encoding by the encoder.

3. An apparatus as defined in claim 1, wherein the data in the native format includes a composite associated with a type.

4. An apparatus as defined in claim 3, wherein the type includes at least one of a C-structure or an enumeration.

5. An apparatus as defined in claim 1, further including a pointer manager to identify a first one of the elements in the data in the native format.

6. An apparatus as defined in claim 5, further including a composite interface description (CID) file generator to generate a CID file to store the architecture agnostic metadata, wherein the architecture agnostic metadata includes at least one of different bytes sizes, endianness, or offset alignments.

7. An apparatus as defined in claim 6, wherein the CID file generator is to encode the elements of the data into the CID file.

8. An apparatus as defined in claim 7, wherein the elements of the data include at least one of a composite type, a composite name, a composite element name, or a composite element type.

9. An apparatus as defined in claim 5, further including a composite layout description (CLD) file generator to generate a CLD file to store the architecture specific metadata, the architecture specific metadata including at least one of a definition of a type of composite, a name of the composite, a list of composite elements names, a list of corresponding types, or array dimension information.

10. An apparatus as defined in claim 9, further including a payload analyzer to:
identify the offset values associated with the elements of the data in the native format; and
write the offset values in the CLD file.

11. An apparatus as defined in claim 1, further including a task process compiler to compile the architecture agnostic metadata and the architecture specific metadata into a task executable of the sending peer.

12. A method to reduce network transmission bandwidth of a sending peer, comprising:
preventing, by executing an instruction with a processor, an encoder from encoding data from a native format to a target format associated with a requesting peer in response to an initial transmission trigger from the requesting peer;
retrieving, by executing an instruction with the processor, architecture agnostic metadata corresponding to the data based on the native format;
retrieving, by executing an instruction with the processor, architecture specific metadata corresponding to the data based on the native format, the architecture specific metadata including offset values and descriptions of portions of the data, the portions including elements of the data in the native format; and
reducing the network transmission bandwidth by sending, by executing an instruction with the processor, the data in the native format combined with the architecture agnostic metadata and the architecture specific metadata to the requesting peer, the architecture agnostic metadata and the architecture specific metadata to facilitate translation of the data in the native format into the target format by the requesting peer, the requesting peer having an architecture different than that of the sending peer.

13. A method as defined in claim 12, further including identifying a first one of the elements in the data in the native format.

14. A method as defined in claim 13, further including generating a composite layout description (CLD) file to store the architecture specific metadata, the architecture specific metadata including at least one of a definition of a type of composite, a name of the composite, a list of composite elements names, a list of corresponding types, or array dimension information.

15. A method as defined in claim 14, further including:
identifying the offset values associated with the elements of the data in the native format; and
writing the offset values in the CLD file.

16. A tangible computer readable storage medium comprising computer readable instructions which, when executed, cause a processor to at least:
prevent an encoder from encoding data from a native format to a target format associated with a requesting peer in response to an initial transmission trigger from the requesting peer;
retrieve architecture agnostic metadata corresponding to the data based on the native format;
retrieve architecture specific metadata corresponding to the data based on the native format, the architecture specific metadata including offset values and descriptions of portions of the data, the portions including elements of the data in the native format; and
reduce network transmission bandwidth by sending the data in the native format combined with the architecture agnostic metadata and the architecture specific metadata to the requesting peer, the architecture agnostic metadata and the architecture specific metadata to facilitate translation of the data in the native format into he target format by the requesting peer, the requesting peer having an architecture different than that of a sending peer.

17. A tangible computer readable storage medium as defined in claim 16, wherein the instructions are to cause the processor to transmit the data in the native format in a storage footprint smaller than that of the data in the native format after encoding by the encoder.

18. A tangible computer readable storage medium as defined in claim 16, wherein the instructions are to cause the processor to transmit the native format as a binary format.

19. A tangible computer readable storage medium as defined in claim 16, wherein the instructions are to cause the processor to identify a first one of the elements in the data in the native format.

20. A tangible computer readable storage medium as defined in claim 19, wherein the instructions are to cause the processor to generate a composite interface description (CID) file to store the architecture agnostic metadata, wherein the architecture agnostic metadata includes at least one of different bytes sizes, endianness, or offset alignments.

21. A tangible computer readable storage medium as defined in claim 20, wherein the instructions are to cause the processor to encode the elements of the data into the CID file.

22. A tangible computer readable storage medium as defined in claim 19, wherein the instructions are to cause the processor to generate a composite layout description (CLD) file to store the architecture specific metadata, the architecture specific metadata including at least one of a definition of a type of composite, a name of the composite, a list of composite elements names, a list of corresponding types, or array dimension information.

23. A tangible computer readable storage medium as defined in claim 22, wherein the instructions are to cause the processor to:
identify the offset values associated with the elements of the data in the native format; and
write the offset values in the CLD file.

24. A tangible computer readable storage medium as defined in claim 16, wherein the instructions are to cause the processor to generate a metadata reference associated with the combined architecture agnostic metadata and the architecture specific metadata.

25. A tangible computer readable storage medium as defined in claim 16, wherein the instructions are to cause the processor to compile the architecture agnostic metadata and the architecture specific metadata into a task executable of the sending peer.

* * * * *

UNITED STATES PATENT AND TRADEMARK OFFICE
CERTIFICATE OF CORRECTION

PATENT NO. : 10,609,171 B2
APPLICATION NO. : 15/775935
DATED : March 31, 2020
INVENTOR(S) : Amol Shivaji Dhere and Henrik Krogh Moeller Page 1 of 1

It is certified that error appears in the above-identified patent and that said Letters Patent is hereby corrected as shown below:

In the Claims

Column 36, Line 12 (Claim 16):
Replace "he target format by the requesting" with --the target format by the requesting--.

Signed and Sealed this
Fifth Day of January, 2021

Andrei Iancu
*Director of the United States Patent and Trademark Office*